United States Patent
Spencer

(10) Patent No.: US 11,383,832 B2
(45) Date of Patent: Jul. 12, 2022

(54) VARIABLE-GEOMETRY VERTICAL TAKE-OFF AND LANDING (VTOL) AIRCRAFT SYSTEM

(71) Applicant: Cameron Spencer, Mount Martha (AU)

(72) Inventor: Cameron Spencer, Mount Martha (AU)

( * ) Notice: Subject to any disclaimer, the term of this patent is extended or adjusted under 35 U.S.C. 154(b) by 211 days.

(21) Appl. No.: 16/766,552

(22) PCT Filed: Dec. 11, 2018

(86) PCT No.: PCT/IB2018/001569
§ 371 (c)(1),
(2) Date: May 22, 2020

(87) PCT Pub. No.: WO2019/116101
PCT Pub. Date: Jun. 20, 2019

(65) Prior Publication Data
US 2021/0362848 A1    Nov. 25, 2021

Related U.S. Application Data

(60) Provisional application No. 62/597,823, filed on Dec. 12, 2017.

(51) Int. Cl.
*B64C 29/00* (2006.01)
*B64C 11/00* (2006.01)
(Continued)

(52) U.S. Cl.
CPC ........ *B64C 29/0033* (2013.01); *B64C 11/001* (2013.01); *B64D 17/025* (2013.01);
(Continued)

(58) Field of Classification Search
CPC ........................ B64C 29/0033; B64C 11/001
See application file for complete search history.

(56) References Cited

U.S. PATENT DOCUMENTS 2,510,561 A     6/1950 DeLaval
4,506,849 A *   3/1985 Lemont .................. B64C 27/20
                                                    244/6
(Continued)

FOREIGN PATENT DOCUMENTS

WO    2014045276 A1    3/2014
WO    2017063088 A1    4/2017

OTHER PUBLICATIONS

Extended Search Report for European Application No. 18889855.5 dated Jul. 22, 2021, 9 pages.
(Continued)

*Primary Examiner* — Richard R. Green
*Assistant Examiner* — William L Gmoser
(74) *Attorney, Agent, or Firm* — Suiter Swantz pc llo

(57) ABSTRACT

A variable-geometry vertical takeoff and landing (VTOL) aircraft system may transport passengers from a departure point to a destination via partially or fully autonomous flight operations. The VTOL aircraft system may operate in hover-based ascent/descent modes, level-flight cruising modes, and transitional modes between the two. Thrust may be provided by ducted propeller units articulable relative to the fuselage; by articulating the airfoil struts connecting the thrust sources to the fuselage the thrust sources may be manipulated for ascent/descent, transition, and cruising. in order to control ascent, descent, and cruise. More precise thrust control may be achieved by further articulation of the annular propeller ducts relative to the airfoil struts. The airfoil struts and propeller ducts may present a wing-shaped or variably segmented cross section to maximize achievable lift.

12 Claims, 28 Drawing Sheets

(51) Int. Cl.
  *B64D 17/02* (2006.01)
  *G05D 1/08* (2006.01)
  *B64D 17/72* (2006.01)
  *B64D 17/80* (2006.01)

(52) U.S. Cl.
  CPC ........... *G05D 1/0858* (2013.01); *B64D 17/72* (2013.01); *B64D 17/80* (2013.01)

(56) References Cited

U.S. PATENT DOCUMENTS

| | | |
|---|---|---|
| 8,342,441 B2 | 1/2013 | Yoeli |
| 2006/0016930 A1 | 1/2006 | Pak |
| 2008/0105781 A1 | 5/2008 | Belleville |
| 2019/0291863 A1* | 9/2019 | Lyasoff .................. G05D 1/102 |

OTHER PUBLICATIONS

International Search Report and Written Opinion dated Apr. 23, 2019 for PCT/IB2018/001569.

* cited by examiner

VARIABLE-GEOMETRY VERTICAL TAKE-OFF AND LANDING (VTOL) AIRCRAFT SYSTEM

CROSS-REFERENCE TO RELATED APPLICATIONS

The instant application claims priority under 35 U.S.C. § 119(e) to international patent application PCT/IB2018/001569 filed Dec. 11, 2018, and to provisional U.S. Patent Application Ser. No. 62/597,823 filed Dec. 12, 2017. Said international patent application PCT/IB2018/001569 and said U.S. Patent Application 62/597,823 are herein incorporated by reference in their entirety.

BACKGROUND

Vertical takeoff and landing (VTOL) type aircraft, whether manned or unmanned, are characterized by vertical or near-vertical takeoff and landing or "hover" phases (e.g., flight segments), relatively horizontal forward-flight or "cruise" phases (e.g., relatively parallel to the ground), and transitional phases or segments. For example, the aircraft, having taken off along a substantially vertical heading, may transition to forward flight; similarly, a forward-flying aircraft may, when preparing to land, transition to a substantially vertical landing phase. In any case, the thrust vector of the aircraft as it travels may be characterized by a vertical-lift component and a forward-thrust component, the relationship between the two components shifting from phase to phase as needed to keep the aircraft aloft or propel it forward.

Such transitional phases may include reconfiguration of the aircraft or of its components, to account for shifts in the aircraft's speed or center of gravity. A core design problem with respect to VTOL aircraft is to achieve reasonable efficiency of operation (e.g., cost efficiency) throughout all phases or segments of flight. Characteristics of such a reasonably efficient design may include:
- orientation of the wings such that the lower wing surfaces remain parallel or near parallel to the forward path of the aircraft, or to oncoming airflow;
- orientation of thrust sources (e.g., engines, propellers) such that their directional thrust vectors are parallel to the forward path of the aircraft, or to oncoming airflow;
- preventing the outflow or exhaust of any one thrust source from ingestion by the intake of any other thrust source or inducing turbulent airflow across another aerodynamic surface;
- for aircraft having two or more thrust sources, when the aircraft is in a "hover" phase, arranging said thrust sources symmetrically with respect to the aircraft's center of gravity;
- for aircraft having multiple thrust sources, maintaining each thrust source at a similar size to avoid cross-source interference and minimize operating noise;
- positioning thrust sources such that during "cruise" phases the aircraft's center of gravity coincides with its center of lift, and that the center of sideways lift (e.g., force relative to the yaw or z-axis of the aircraft due to lateral inward airflow) is sufficiently aft of the center of gravity to produce a stabilizing force; and
- minimizing total weight and volume not only by optimizing the aircraft's shape, but by minimizing the necessary moving components, actuators, and structural elements.

SUMMARY

Embodiments of the inventive concepts disclosed herein are directed to a variable-geometry vertical takeoff and landing (VTOL) aircraft system. The aircraft system may be partially controllable by an onboard pilot or passengers, or remotely controlled and operated (e.g., with passenger control input only being necessary under emergency conditions). The VTOL aircraft system may pick up passengers at designated departure points and transport the occupying passengers to any of a number of desired destinations; in either case, the departure and destination points are associated with designated ascent and descent corridors to allow for safe and unobstructed vertical takeoffs and landings, as well as transitions between a hover-based flight mode and a level flight mode. The VTOL aircraft system may include external sensors for determining the position, attitude, altitude, and other relevant parameters of the aircraft system as well as external conditions, e.g., air temperatures, wind speed, environmental and weather conditions. An onboard control system may determine the operative flight phase or segment (e.g., ascent, level flight/cruise, descent, transition) and manage aircraft operations based on appropriate parameters for each flight segment. The aircraft system may be powered by paired ducted propellers or other like thrust sources. Thrust vectoring may be controlled by the articulation of each individual thrust source relative to the fuselage; e.g., the thrust sources may be oriented in a substantially vertical direction for ascent/descent and a substantially horizontal/diagonal direction for cruising. Each thrust source may extend from the fuselage via an articulable airfoil strut having a wing-shaped cross section to generate lift. The propeller ducts may similarly present a wing-shaped cross section which may be segmented or variable throughout the circumference of the duct. More precise thrust vectoring may be achieved by the articulation of the thrust source and its enclosing duct relative to the airfoil struts. Flight operations may be achieved by a combination of thrust generation (e.g., via motor-driven rotation of the propeller rotors) and articulation of the airfoil struts and annular ducts.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

VARIABLE-GEOMETRY CONFIGURATION

Figure 1:
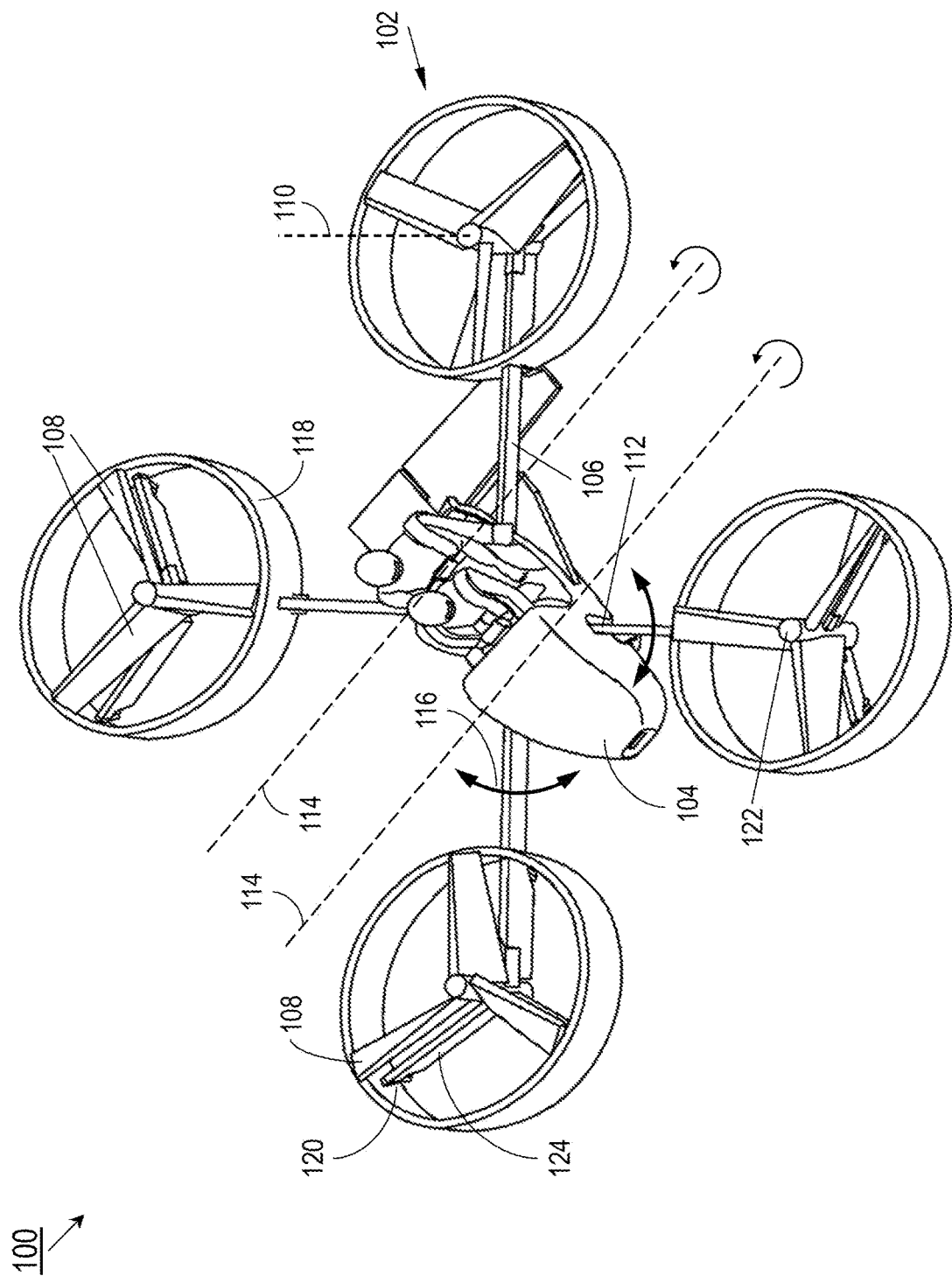
FIG. 1 illustrates a forward perspective view of an exemplary embodiment of a variable-geometry vertical takeoff and landing (VTOL) aircraft according to the inventive concepts disclosed herein in a hovering configuration.

Referring generally to FIGS. 1 through 5, in a first aspect, embodiments of the inventive concepts disclosed herein are directed to a variable-geometry VTOL aircraft system (100). The aircraft 100 may be propelled by paired thrust sources (102) connected to a fuselage (104) by articulable main struts (106). For example, each thrust source 102 may include grouped propeller blades (108) (e.g., two, three, or four rotors per thrust source) configured to generate lift by rotating around a rotor axis (110). The thrust sources 102 may be "paired" in that, using the example of an aircraft 100 having four thrust sources, the forward-left and forward-right thrust sources may be configured for symmetrical articulation as a pair via their respective main struts 106 (similarly, the aft-left and aft-right thrust sources may be symmetrically configured for articulation as a pair).

Figure 3:
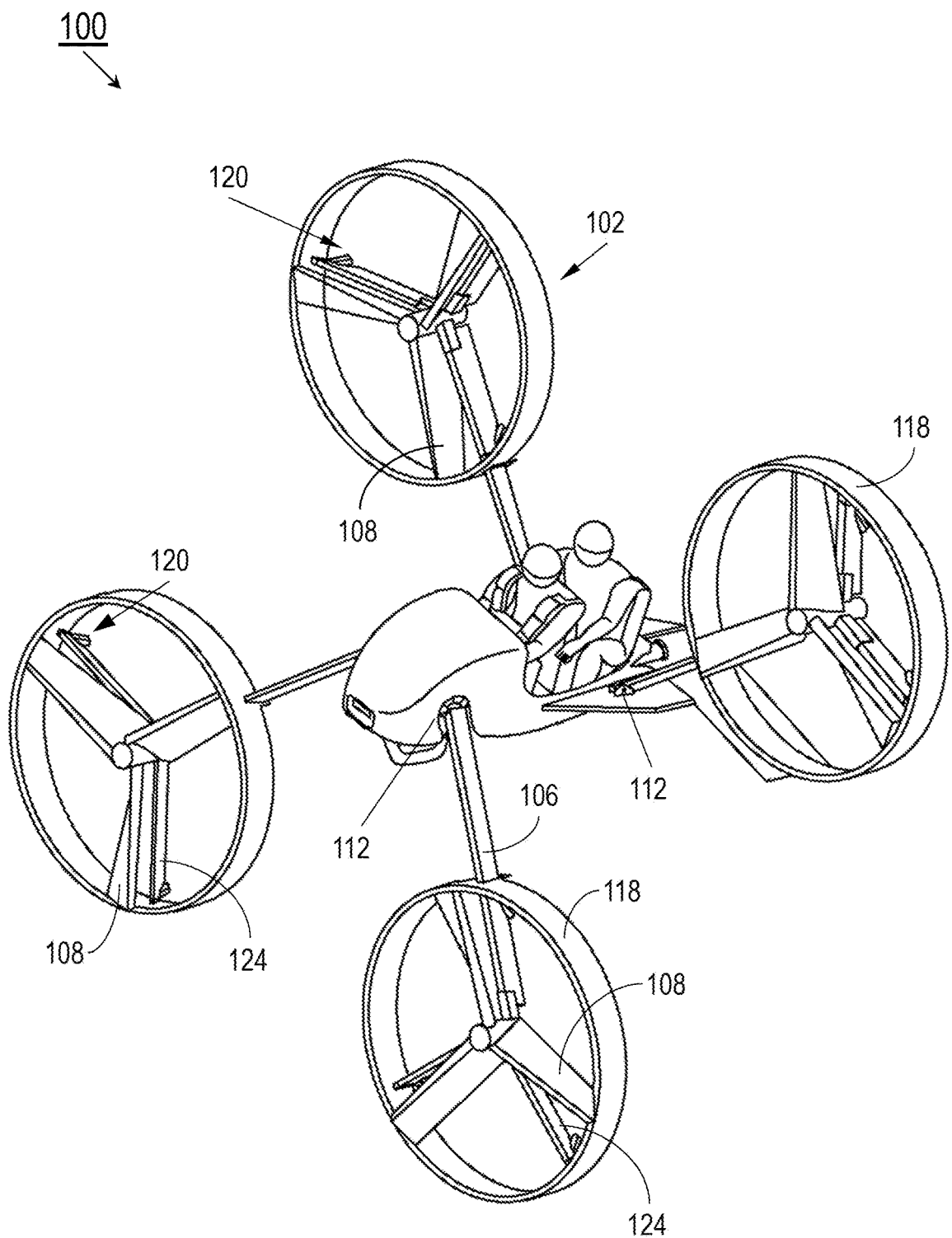
FIGS. 3 and 4 illustrate, respectively, forward perspective and rear perspective views of the VTOL aircraft of FIG. 1 in a directional-flight configuration.

Each main strut 106 may be connected to the fuselage 104 by an articulable hinge 112 capable of rotation through multiple degrees of freedom. For example, the forward and aft main struts 106 may each be configured for rotation (the left strut in concert with the right strut) through a substantially 90-degree range around rotational axes 114 parallel to the pitch axis of the aircraft 100. The forward main struts 106 (e.g., forward-left and forward-right) and/or rear struts may further be configured for symmetrical articulation (via the hinge 112) through a range of approximately 90 degrees around axes of rotation 116 orthogonal to the rotor axes 110. Articulation of the main struts 106 and thrust sources 102 may be achieved via linear or rotary actuators connected to an onboard power source within the fuselage 104, either directly controlled by the pilot or with some degree of autonomy; control programming may autonomously or semi-autonomously manage the articulation of the thrust sources 102 depending on a range of fixed and environmental factors such as flying weight, the current velocity and heading of the aircraft 100, wind intensity and direction, air temperature and pressure, and available thrust. Even without the additional degree of freedom provided by the hinged actuators connecting the forward main struts 106 to the fuselage 104, rotating the forward and aft main struts 106 in unison when transitioning the VTOL aircraft 100 from the hovering configuration shown by FIG. 1 to the cruising (e.g., level flight) configuration shown by FIG. 3 may effectively direct the exhaust/outflow of the forward thrust sources 102 away from the air intake of the aft thrust sources (which, as shown by FIG. 3, may be rotated to an orientation above the forward thrust sources). However, this additional degree of freedom may provide for rapid yaw stabilization while the VTOL aircraft 100 is in cruise configuration by articulating the annular wings 118 as described in greater detail below.

Figure 5:
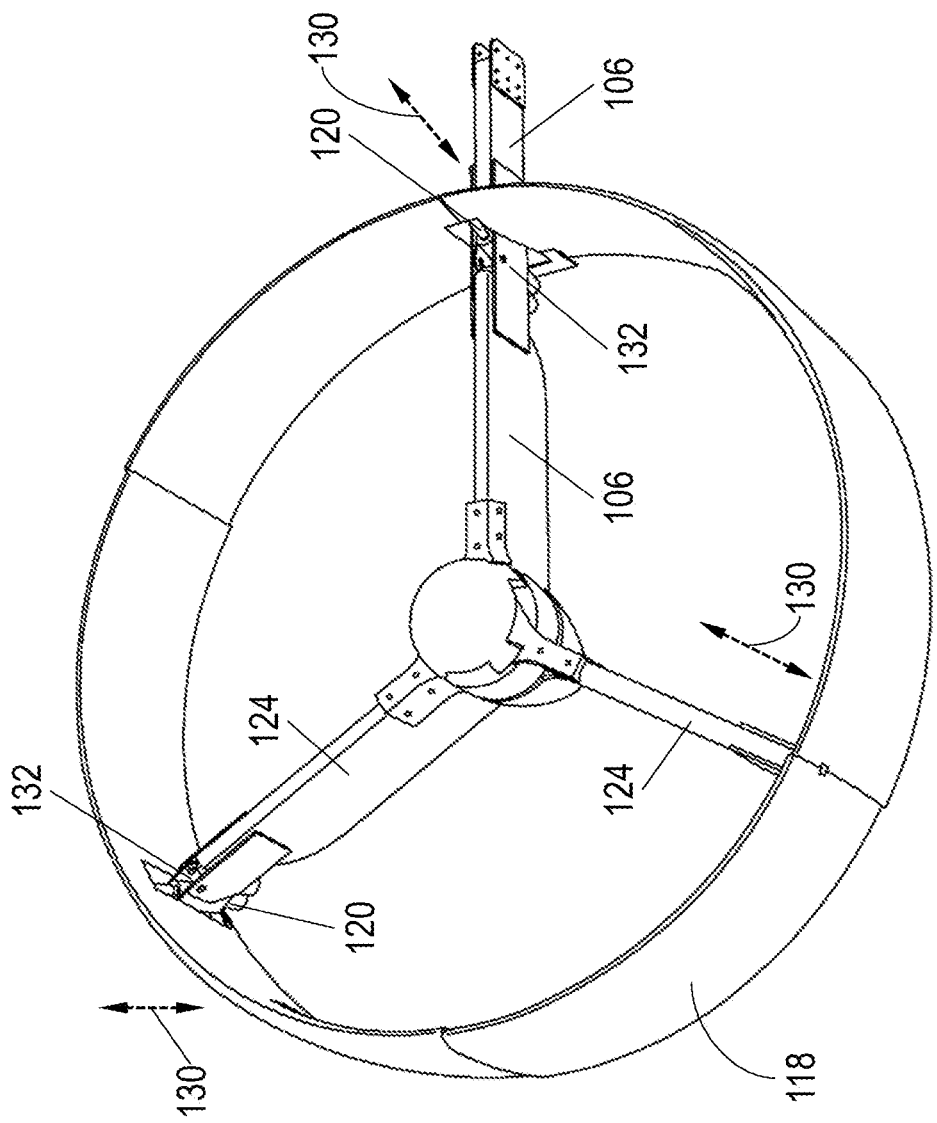
FIG. 5 illustrates a forward view of an annular wing of the VTOL aircraft of FIG. 1.

As previously noted, each thrust source 102 may include a group or assembly of evenly spaced propeller blades 108 configured for rotation around a common rotor axis 110. Each thrust source 102 may be a ducted, or shrouded, thrust source whereby the propeller blades 108 are enclosed by an annular or cylindrical structure capable of directing the outflow of the thrust source. Referring in particular to FIG. 5, this annular structure may be an annular wing 118, wherein the structure is in cross-section a full or partial airfoil (e.g., those sections of the annular wing proximate to the "top" or highest point when the aircraft is in cruising configuration (see, e.g., FIGS. 12A-C)) capable of providing additional lift in both hovering and cruising configurations as well as a nozzle effect (e.g., greater thrust at lower rotor speeds) characteristic of ducted thrust sources. For example, the annular wing 118 may surround the thrust source 102, providing a degree of impact protection to the rotors and rotor assembly (e.g., propeller blades 108) as well as protecting nearby persons from potential injury. The annular wings 118 may provide a degree of noise cancellation by absorbing selected frequencies associated with the propeller blades 108.

Each annular wing 118 may be attached to its corresponding main strut 106 by a plurality of evenly spaced, articulable mounting points defined by linear actuators 120. For example, a main strut 106 may terminate in a rotor shaft 122 and/or root, around which the propeller blades 108 are configured to rotate. The main strut 106 may present an airfoil cross-section, similar to that of the annular wing 118 (see, e.g., FIGS. 12A-C), in order to provide additional lift when oriented for cruising in forward-flight (see, e.g., FIGS. 3 and 4). The annular wing 118 may be mounted to the main strut 106 at the point of intersection; additional auxiliary struts 124 (e.g., symmetric airfoils) may connect the rotor shaft 122 to the annular wing at evenly spaced points.

Figure 2:
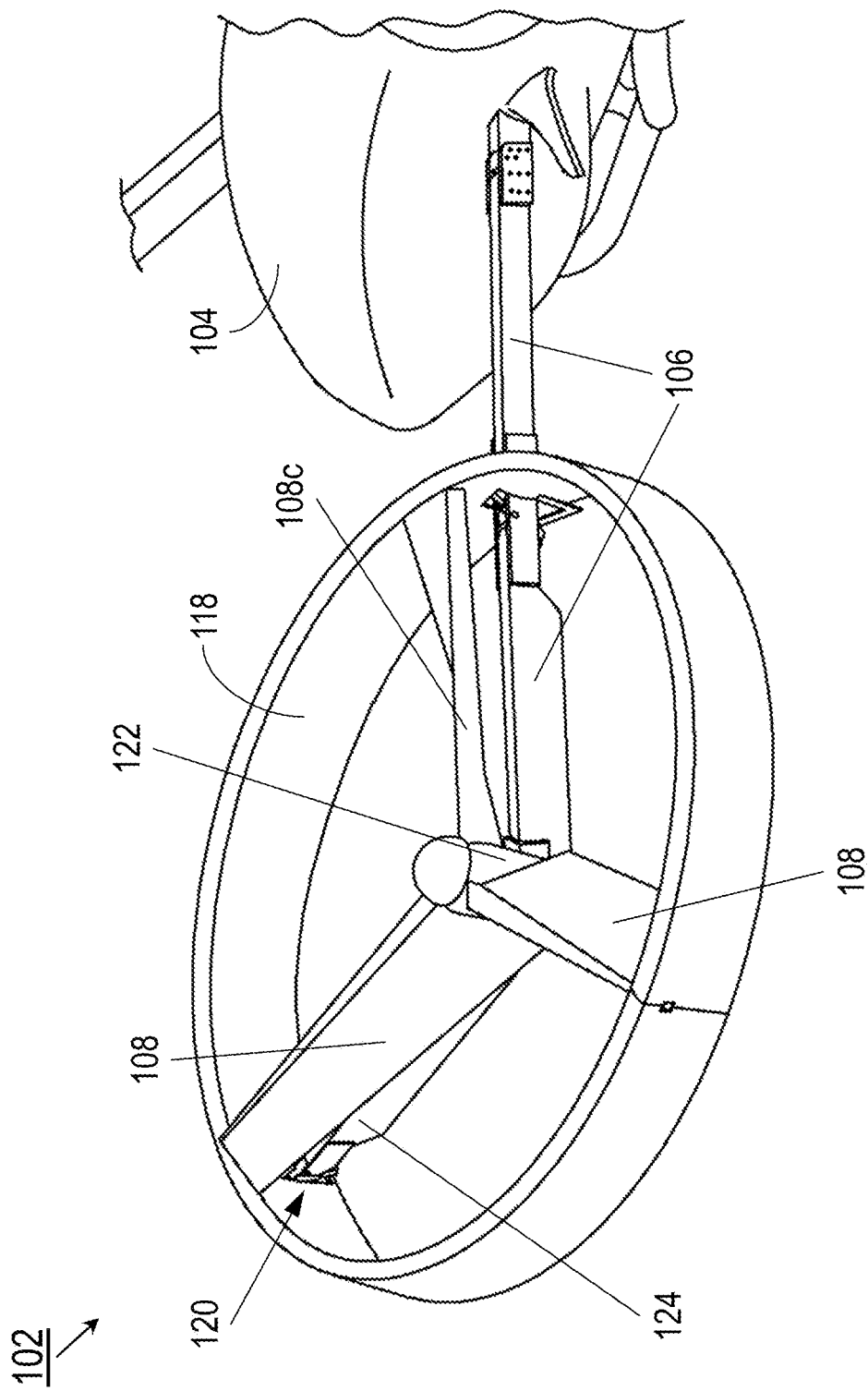
FIG. 2 illustrates a detailed view of a thrust source and strut assembly of the VTOL aircraft of FIG. 1.
Figure 4:
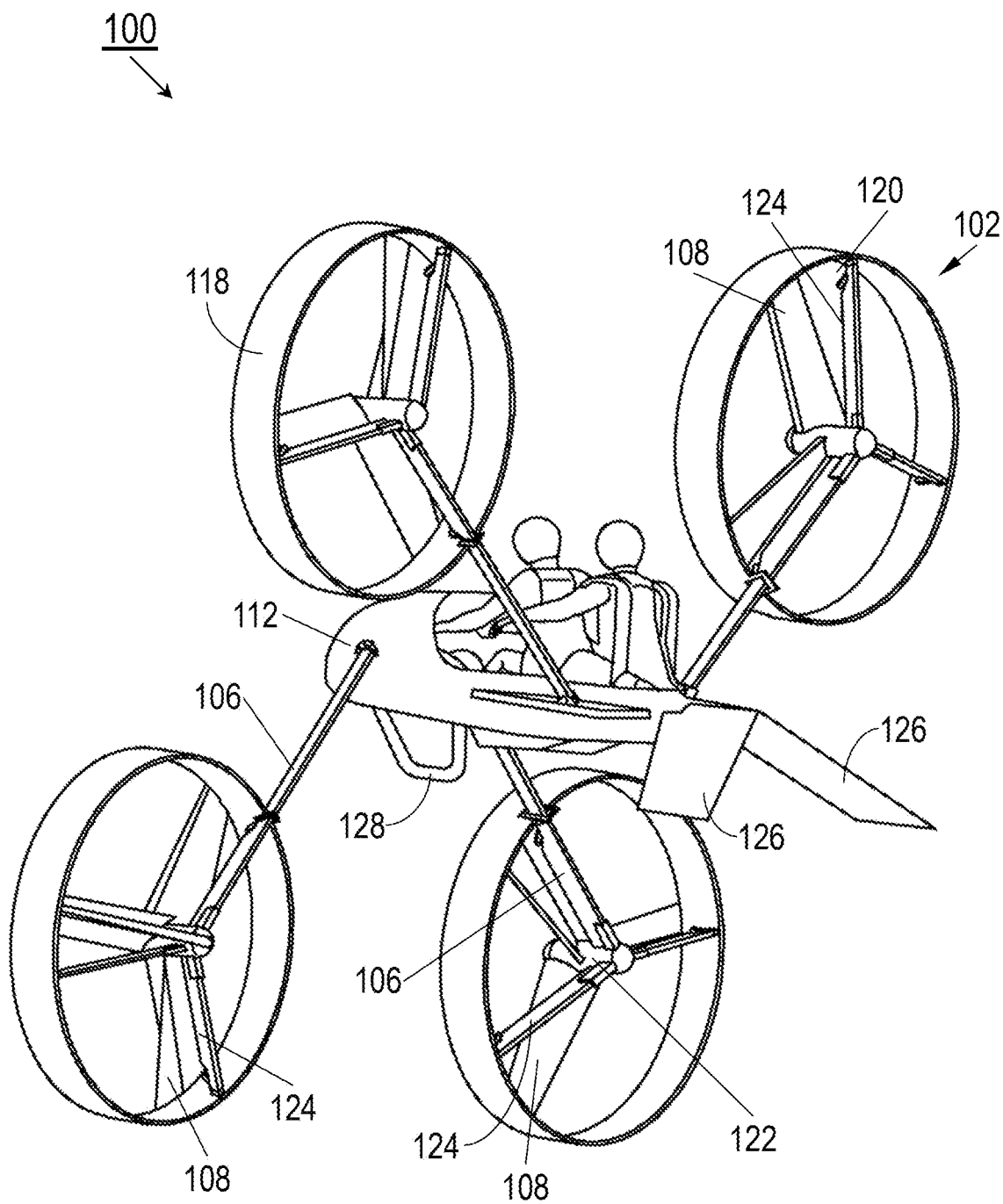

For example, referring in particular to FIGS. 2 and 5, a thrust source 102 (e.g., a left front thrust source of the aircraft 100, FIG. 1) may incorporate auxiliary struts 124 that terminate (as does the main strut 106) in an articulable mounting point, such that an n-rotor thrust source may be mounted (via its shrouding annular wing 118) to the main strut 106 at n articulable mounting points (corresponding to linear actuators 120, FIG. 5), including the airfoil strut itself and (n-1) auxiliary struts. For example, the thrust source 102a may incorporate three evenly spaced propeller blades 108 and two auxiliary struts 124 at 120-degree angles to the main strut 106 and to each other. Referring in particular to FIG. 4, the VTOL aircraft 100 may include aft stabilizers 126 and one or more forward dorsal struts 128 for ground contact and landing. The aft stabilizers 126 and/or dorsal struts 128 may be reinforced for ground contact during landing, and equipped with a ground drive system as described below.

Figure 6:
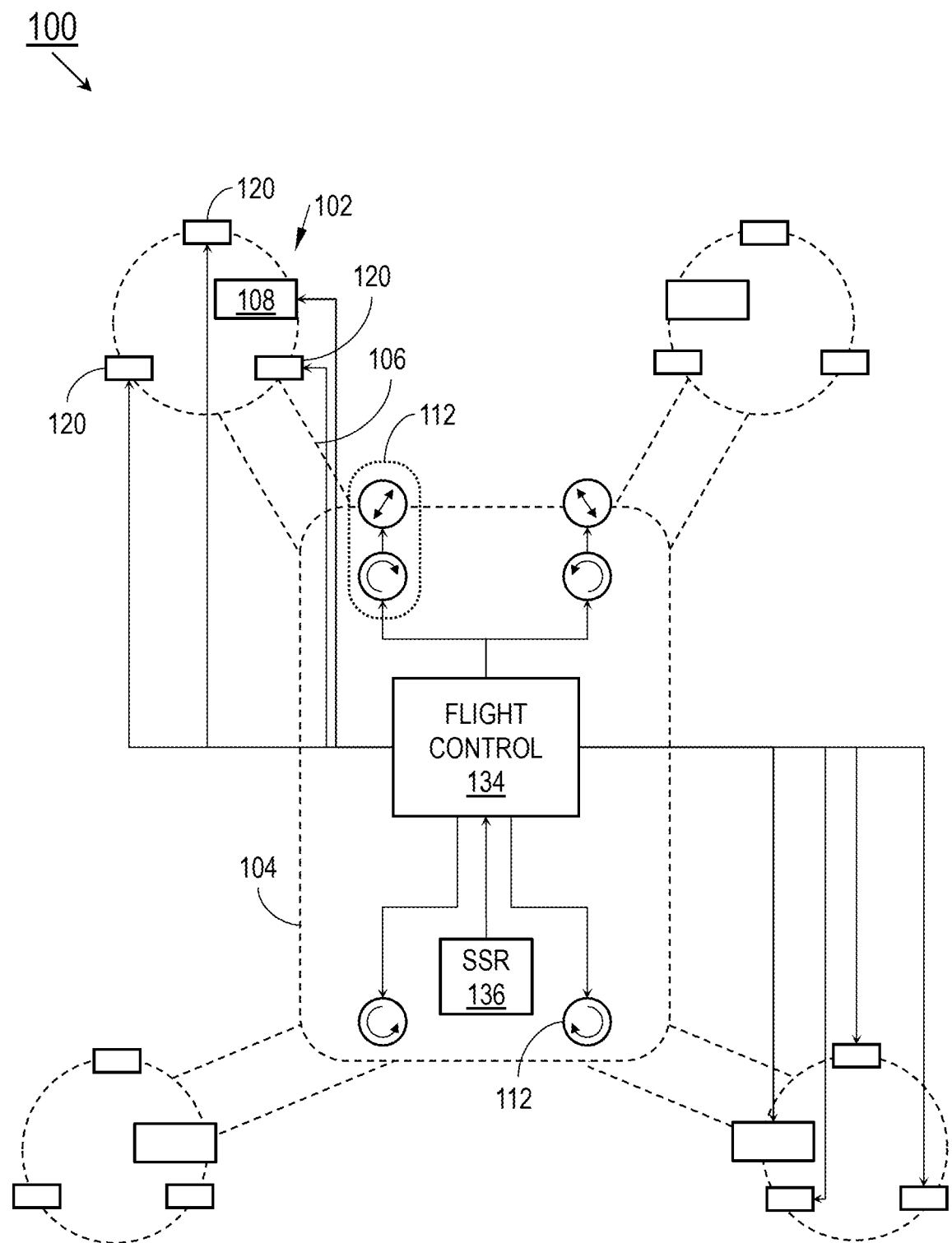
FIG. 6 is a diagrammatic illustration of a flight control system of the VTOL aircraft of FIG. 1.

Referring in particular to FIGS. 5 and 6, each articulable mounting point of the thrust source 102 may include a linear actuator 120, manually or automatically controllable to articulate the annular wing 118 relative to its connecting main strut 106 or to its connecting auxiliary strut 124. For example, each linear actuator 120 may provide for 2 degrees of tilt (130) relative to the rotor axis 110 at the upper end and 1 degree of tilt at the lower end (e.g., via a ball joint (not shown) mounted to the top of the linear actuator, and a single axis hinge 132 via which the linear actuator may be hingedly attached to the main strut 106 or auxiliary strut 124) while actuating the annular wing 118 parallel to the rotor axis 110 (FIG. 1) and/or tilting the annular wing 118. In this way, the linear actuators 120, acting alone or in combination, may tilt the annular wing 118 relative to the main strut 106 (and to the rotor axis 110) for precise control of directional thrust while the total effect of the lower 1 degree hinge on all three linear actuators 120a-c may restrict sideways motion of the annular wing 118 relative to the rotor axis 110 and prevent intersection with the propeller blades 108. Similarly, the annular wing 118 may be articulated forward and backward as a whole, parallel to the rotor axis 110 (e.g., longitudinally relative to rotor axis), by articulating the full set of linear actuators 120 in concert. Fine flight path adjustment may further be achieved by other flow redirecting surfaces behind the propeller blades 108 (FIGS. 1-4), or by other movable aerodynamic surfaces attached to the main strut 106 itself. The propeller blades 108 themselves may be of any appropriate shape or pitch.

Broadly speaking, via articulation of the main struts 106 (via the hinges 112) and annular wings 118 (via the linear actuators 120), the thrust sources 102 may be positioned such that the thrust vector of the aircraft 100 will be 1) vertical or near vertical during takeoff, landing, and other hover phases; and 2) substantially parallel to the longitudinal axis of the aircraft during forward flight/cruise phases (allowing for necessary maintenance of lift). Available thrust may be controlled by varying the rate of rotation of the propeller blades 108 of one or more thrust sources 102. Flight control may be manual (e.g., via direct control by the pilot) or automatic (e.g., where some degree of flight control assistance is provided by a processor-driven flight control system based on available environmental data (e.g., the current weight of the aircraft, atmospheric and weather conditions, available thrust and fuel, applicable local regulations), or via a remote pilot (e.g. where a pilot sends commands to a processor-driven flight control system remotely using a radio transmitter and radio receiver). Linkages for the propeller blades 108 and/or linear actuators 120 may be run through the interior of the main struts 106 to the flight control system.

Referring to FIG. 6, the VTOL aircraft 100 may incorporate a flight control system 134, including flight control processors, for operation of flight control systems. The flight control system 134 may respond to control input from an onboard pilot, receive remote input from a pilot or operator located remotely from the aircraft 100, or operate with partial or full autonomy according to predetermined flight control algorithms and observed flight data corresponding to the current state of the aircraft 100 (e.g., weight, altitude, heading, velocity, attitude) and/or atmospheric conditions around the aircraft (e.g., air temperature/density/pressure, wind direction/magnitude). Currently observed flight data may include raw data captured by onboard sensors (136) such as position sensors (absolute/satellite-based or relative) and atmospheric sensors and analyzed by the flight control system 134. For examine, the flight control system 134 may determine the current phase or flight segment, such as whether the aircraft 100 is hovering for takeoff or landing, cruising or climbing/descending in forward flight, or transitioning between the two. Based on the current phase or flight segment, the flight control system 134 may impose different parameters on the operation of the aircraft 100 (e.g., maximum speeds) and respond to control input in different ways.

For example, the flight control system 134 may control the orientation of main struts 106 via hinged actuators 112 (see also FIG. 1) controlling the rotation of the main struts 106 relative to the pitch axis of the aircraft 100, and the further pivoting of the front struts. The magnitude and direction of generated thrust may be controlled by regulating, in addition to the orientation of the main struts 106, the rotational speed of the propeller blades 108 and the orientation of the annular wings 118 (via linear actuators 120) of each thrust source 102. Linkages from each thrust source 102 and linear actuator 120 may run through the infrastructure of the corresponding main strut 106.

Ground Drive System for VTOL Aircraft System

Referring generally to FIGS. 7A through 7E, in a further aspect, embodiments of the inventive concepts disclosed herein may be directed to a ground-drive system 200 compatible with the VTOL aircraft system 100 of FIG. 1. It may be difficult to design an undercarriage for such an aircraft such that the aircraft is capable of short-range ground travel (e.g., taking into consideration such factors as steerability, short-term and long-term braking, the ability to traverse uneven terrain, the ability to resist sideforces such as wind or yawing due to sloping ground, the ability to withstand impact loads, and resistance to aerodynamic drag) while minimizing weight and complexity and therefore cost. Conventional approaches to this challenge may be broadly described as either an extendable undercarriage or a motorized trailer or trolley, distinct from the aircraft proper and maneuverable either under its own motorized power or under manual power.

An exemplary embodiment of a ground drive system 200 may be incorporated into vertical or near vertical stabilizing structures of the aircraft, e.g., the stabilizing surfaces 126 (see FIG. 4) or dorsal struts 128 disclosed herein. As noted above, these stabilizing structures 126, 128 may be the closest part of the aircraft 100 to the ground during vertical takeoff/landing "hover" phases, and may serve as ground contact points (e.g., two of three points of ground contact in a "tripod" arrangement as described above).

Figure 7A:
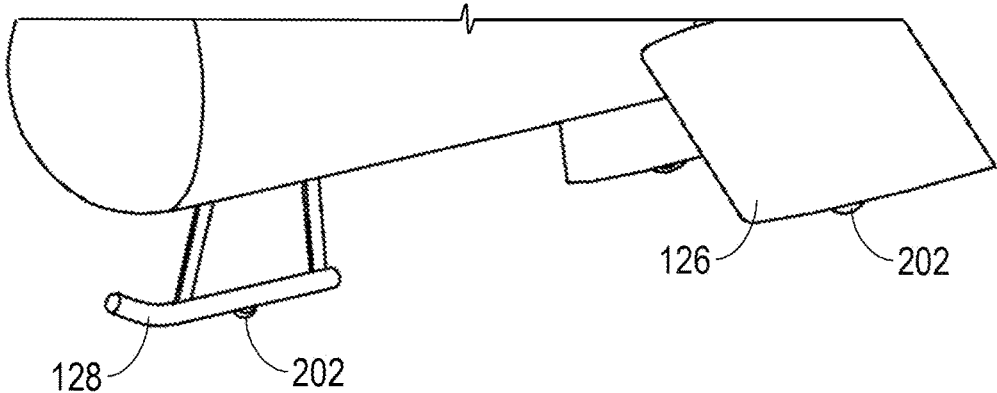
FIGS. 7A-D illustrate an exemplary embodiment of a ground-drive system compatible with the VTOL aircraft of FIG. 1 according to the inventive concepts disclosed herein.
Figure 7B:
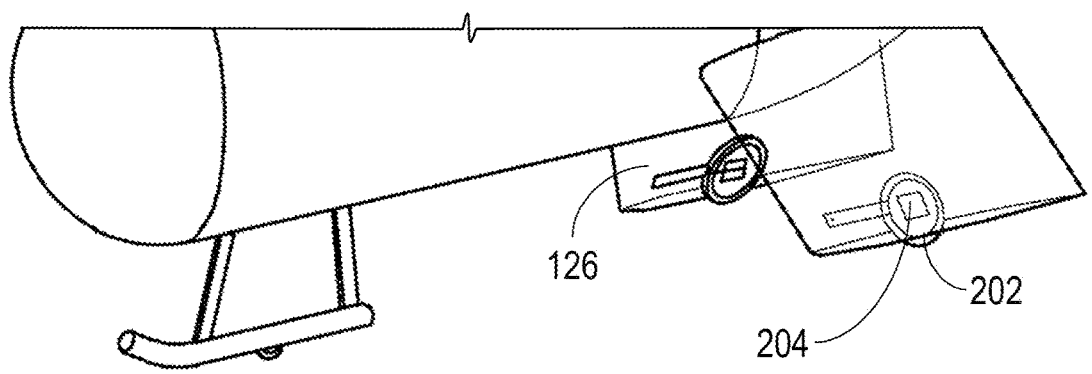
Figure 7C:
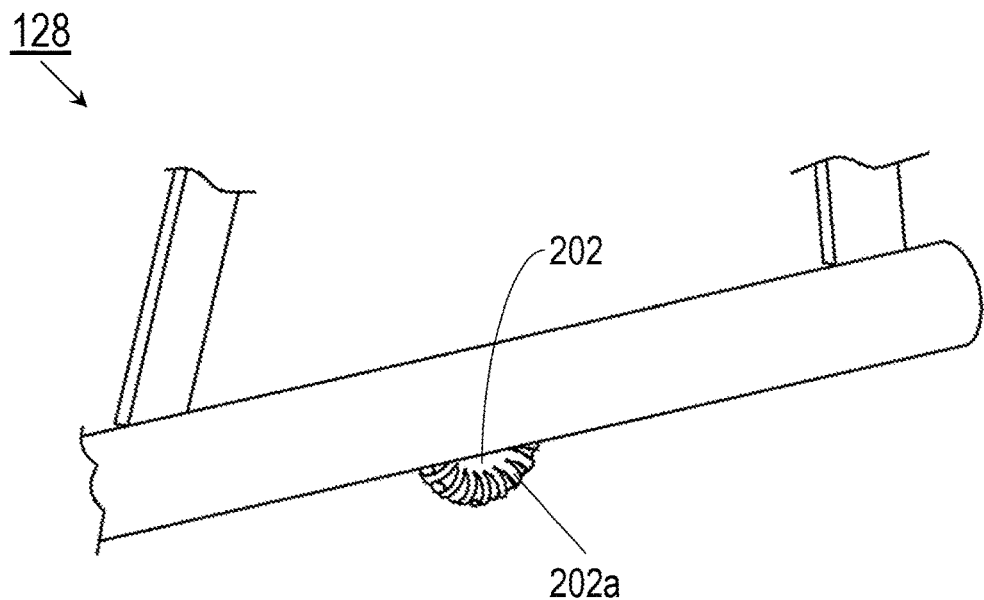
Figure 7D:
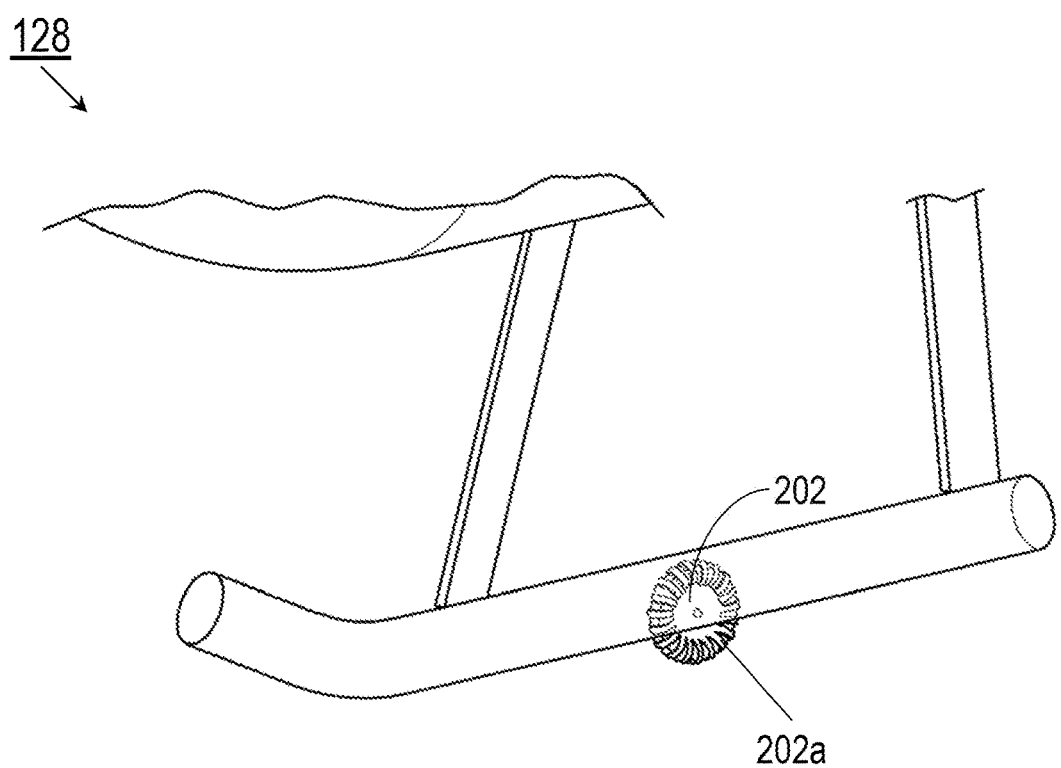

Within such stabilizing structures 126, 128 may be incorporated one or more rubberized wheels 202 (solid or inflatable) protruding from the dorsal end, e.g., the end making contact with the ground. Said wheels 202 may be driven by a motorized spiral or worm gearbox (204) or similar rotary actuator incorporated within the aft stabilizer 126, depending on the desired torque and ground speed. For example, a driven wheel 202 may be incorporated into both a left and a right stabilizer 126; the pilot (or autonomous flight control system) may drive the aircraft 100 along the ground by applying different voltages or currents to actuate the left and right wheels 202 in different combinations. When no voltage or current is applied, the wheels 202 may hold the aircraft 100 in position, in the manner of a parking brake. By applying a greater voltage or current to either wheel 202, the aircraft 100 may be caused to turn in the opposing direction (describing a turn radius relative to the opposing lower-powered wheel). Referring in particular to FIGS. 7A and 7B, the drive system 200 may alternatively be incorporated into forward or aft dorsal struts 128 (either fixed or extendable) having no aerodynamic function. Such a dorsal strut 128 may form the third point of the above-mentioned tripod, upon which the aircraft 100 may make contact with the ground and be driven therealong by the drive system 200.

Figure 7E:
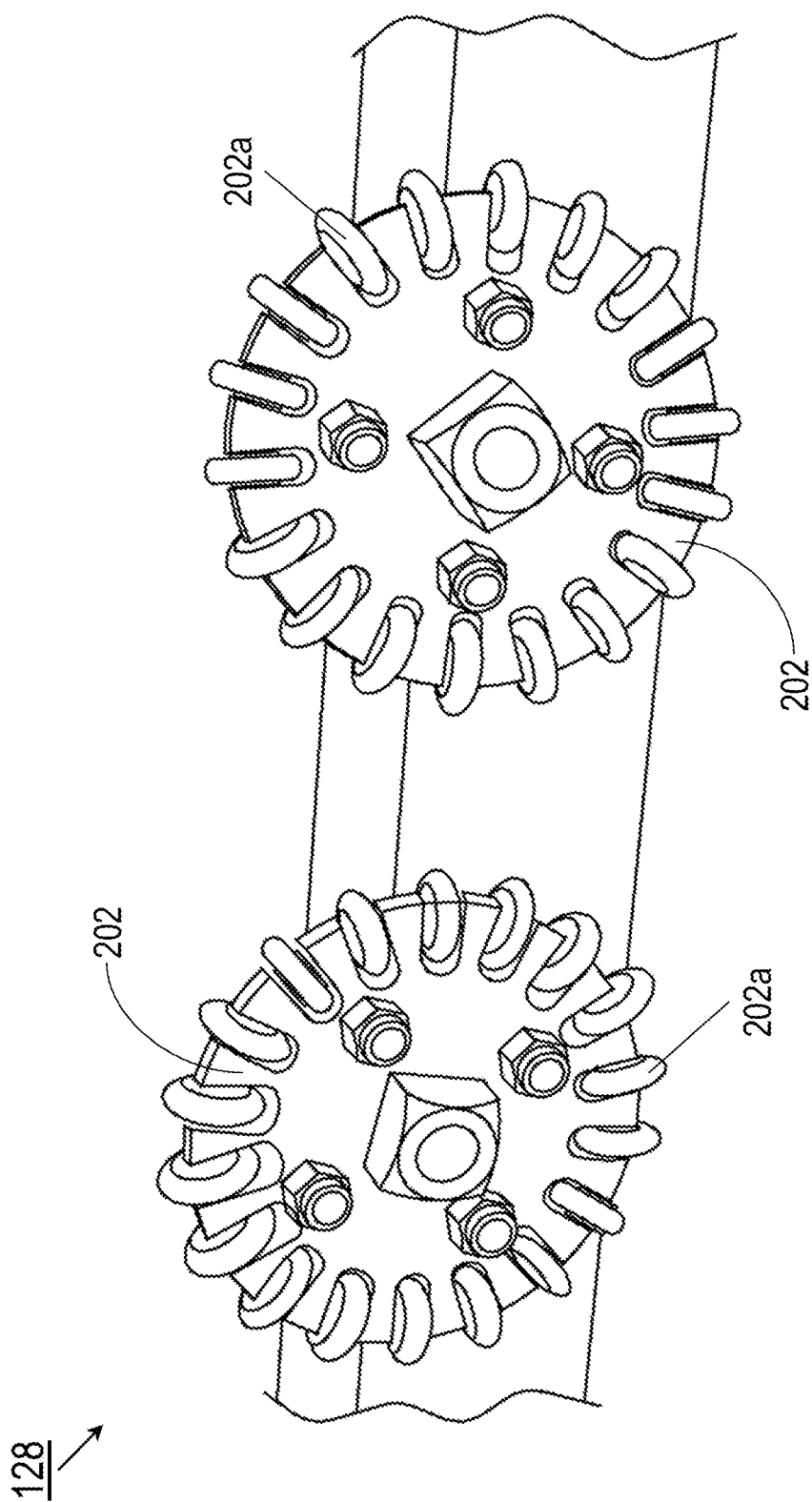
FIG. 7E illustrates a detailed view of a forward wheel assembly of the ground drive system of FIGS. 7A-D.

The drive assembly (wheels 202, gearing motor 204) may be slidably mounted or spring-mounted within the aft stabilizers 126 or dorsal struts 128 so that some degree of impact absorption is provided. Referring also to FIG. 7E, one or more main wheels 202 (e.g., a single front wheel incorporated into a fixed or extendable strut 128) may include smaller auxiliary wheels 202a evenly spaced around the circumference or tread of the main wheel 202 and orthogonally oriented to the main wheel. For example, the main wheel 202 may be oriented to have a rotational axis parallel to the pitch axis of the aircraft 100, while the rotational axis of the auxiliary wheels 202a may correspond to the circumference of the main wheel 202. The auxiliary wheels 202a may enhance the capacity of the main wheel 202 for smooth motion in a lateral direction in which the main wheel 202 might not otherwise be configured to travel. By combining the front mounted main wheel 202/auxiliary wheels 202a with the variably articulable rear wheels (202, FIG. 7A) described above, the "tripod" configuration disclosed herein may allow the aircraft 100 to travel along the ground both longitudinally and laterally while resisting sideforces and suboptimal terrain without the need for a castoring forewheel, a motorized forewheel, or a separate braking system.

Manual Control Interface for VTOL Aircraft

When designing a VTOL aircraft system as disclosed herein, it may be difficult to design a system for manual control and operation of the aircraft that allows for direct control and complex management of aerodynamic controls and thrust generators throughout hovering, transitioning, and cruising flight segments, while at the same time being simple enough for minimally trainable, intuitive operation by pilots of limited experience. Further, such a control interface must also be intuitively operable by experienced pilots, such that habit or muscle memory will not dictate erroneous or undesired control input. For example, helicopters may incorporate cyclic sticks, collective levers, anti-torque pedals, and rudder controls to manage hovering, forward-flight, and autorotation operations; tilt-rotor aircraft may require additional rotor control and trim. Such a complex control interface may require hundreds of hours of training time.

Figure 8:
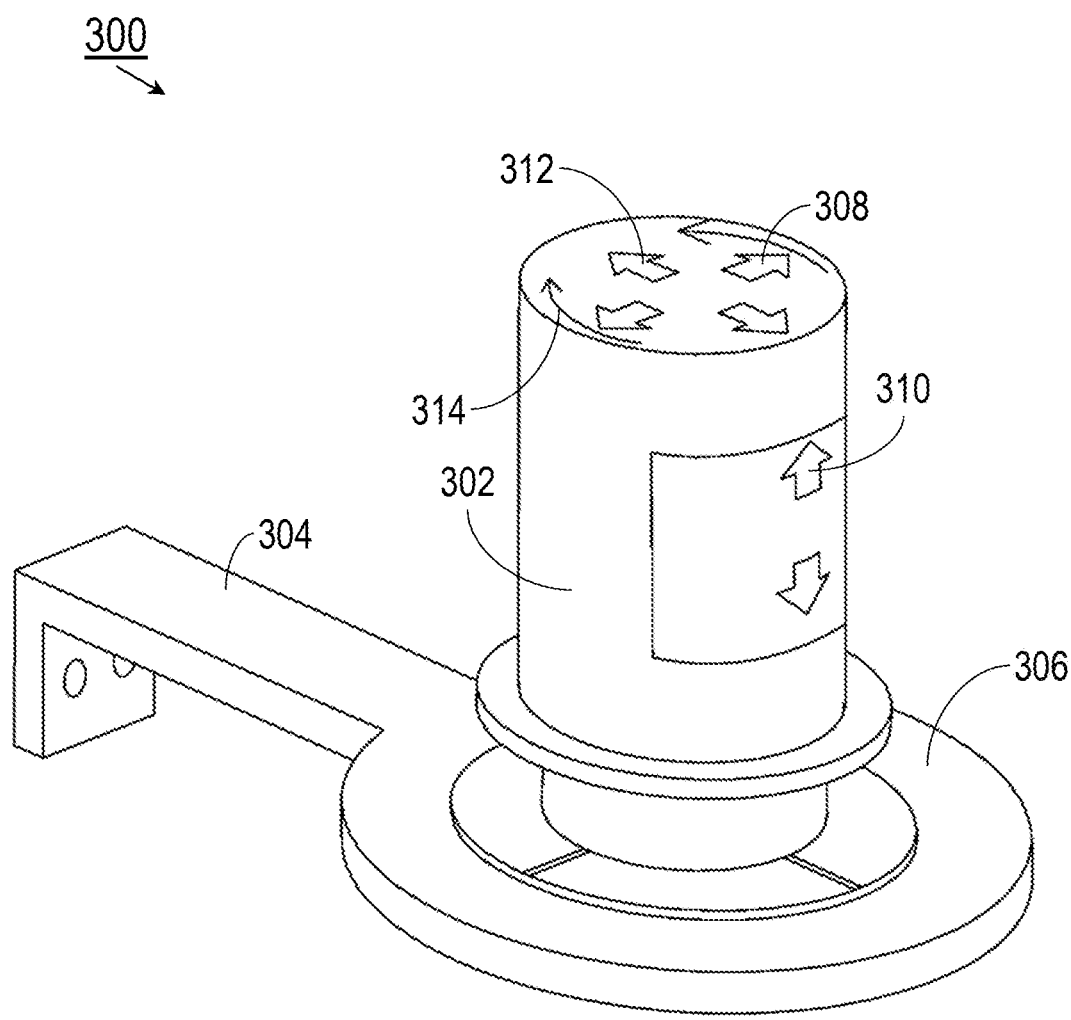
FIG. 8 illustrates an exemplary embodiment of a control yoke for the VTOL aircraft of FIG. 1 according to the inventive concepts disclosed herein.

Referring in particular to FIG. 8, in a still further aspect, an exemplary embodiment of a control interface 300 according to embodiments of the inventive concepts disclosed herein may incorporate a single control yoke (302) mounted inside the aircraft 100 (e.g., within the fuselage 104, in either a centered or offset position). The control yoke 302 may be centered to its base (304) by four (4) interior springs, such that the centering force is proportional to the degree of movement of the control yoke from its default center position. The control yoke 302 may be articulable by the pilot (e.g., using a single hand) throughout four degrees of freedom, or relative to four distinct axes, each axis being notched to provide the pilot with tactile feedback as to the default position and the current displacement therefrom. Variable resistors, or potentiometers, incorporated within the control yoke 302 may measure its displacement from the default position; the measurement of this displacement in one or more directions may be taken as control input by the flight control system 134 (FIG. 6). Based on, for example, the current phase or flight segment, control input may be interpreted by the flight control system 134 in a variety of ways and translated into articulation of the propeller blades 108 (FIGS. 1-5; e.g., to regulate the magnitude of lift or thrust) and/or the main struts 106 and linear actuators 120 (FIGS. 1-5; e.g., to regulate the direction of the generated thrust, thereby steering the aircraft 100). The control yoke 302 may further include a lower lip 306 on which the pilot may rest his/her hand or wrist, and which may also provide visual indication of the degree of vertical (up/down) displacement from the default position.

Figure 9A:
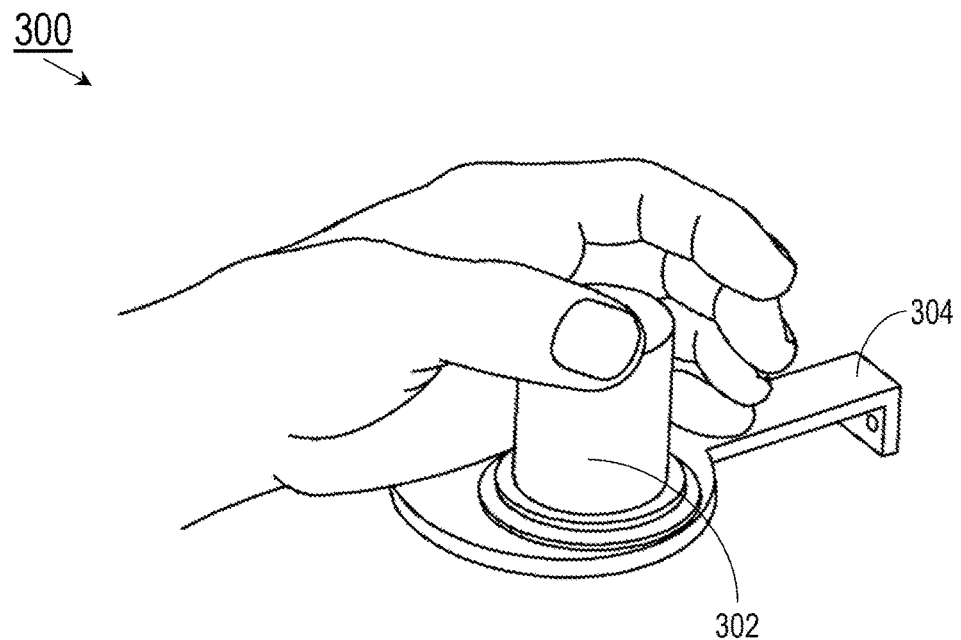
FIGS. 9A and 9B illustrate operations of the control yoke of FIG. 8.
Figure 9B:
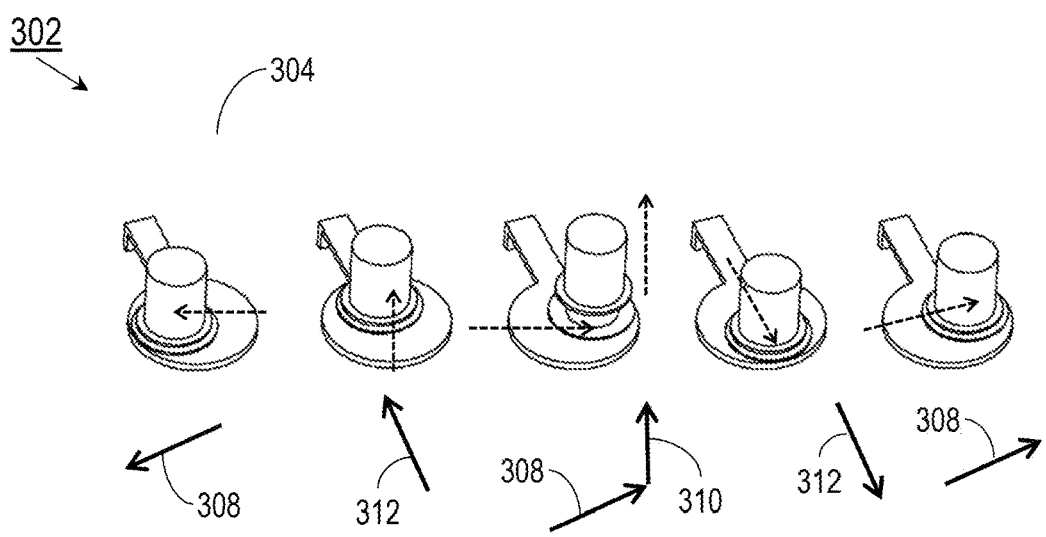

For example, referring also to FIGS. 9A and 9B, the control yoke 302 may be articulable by the pilot along a left-right axis (308; e.g., substantially parallel to a pitch axis of the aircraft); articulable along an up-down axis (310; e.g., along the vertical axis of the yoke, substantially parallel to the yaw axis of the aircraft); articulable along a forward/aft axis (312; e.g., substantially parallel to the roll axis of the aircraft); and rotatable (314) relative to the vertical or yaw axis. The control input generated by each articulation or rotation of the control yoke 302 (or combinations thereof) may be interpreted differently by the flight control system 134 depending on the operative phase or flight segment (as determined by the flight control system 134, based on available aircraft and environmental data). Similarly, depending on the operative phase or segment, the flight control system 134 may impose flight envelope limits (e.g., upon the altitude or airspeed) and limit the articulation or rotation of the control yoke 302 via force-feedback motors incorporated within the control yoke.

For example, during takeoff and landing operations or "hovering" phases (e.g., lateral maneuvering while ascending or descending), the pilot may control forward or rearward maneuvering speed (e.g., up to a maximum speed defined by performance limits or imposed by the flight control system) by maneuvering the control yoke 302 forward or backward (312). The pilot may control ascent or descent speed (e.g., adjusting rotor speeds while the thrust sources 102 are oriented vertically) by articulating the control yoke 302 up or down (310) along its vertical axis. The pilot may control sideways-left or sideways-right speed (e.g., lateral or slewing speed) by displacing the control yoke 302 to the left or right (308). Finally, the pilot may control yaw-left or yaw-right rotation (e.g., clockwise or counterclockwise rotation relative to the yaw axis while hovering) of the aircraft 100 (e.g., by adjusting the orientation of one or more main struts 106, pairs of struts, or thrust sources 102 relative to their struts) by rotating the control yoke 302 to the left or right (314; e.g., counterclockwise/clockwise).

During climb/descent, transitional, and forward-flight phases, the pilot may adjust forward and aft acceleration of the aircraft 100 by articulating the control yoke 302 forward or backward (312). Horizontal steering to the left or right (relative to the current heading of the aircraft 100) may be controlled by articulating the control yoke 302 left or right (308) or rotating the control yoke counterclockwise or clockwise (314; yaw left/right), with the severity of the turn (e.g., turn radius) proportional to the magnitude of displacement of the control yoke. Similarly to takeoff and landing phases, vertical speed may be controlled by articulating the control yoke 302 up or down (310).

As noted above, the flight control system 134 may continually assess and determine the current phase or flight segment based on a variety of parameters both internal and external to the aircraft 100, such as: the weight of the aircraft (including passengers and/or cargo); the current velocity, altitude, and heading of the aircraft; the proximity of the aircraft to identified airborne or ground-based obstacles and/or traffic; and atmospheric conditions such as the wind speed and direction or ambient air density/pressure/temperature. For example, the demarcation between climb/transition and takeoff phases may be based on a relative distance (in three dimensions, including x-y distance and altitude) of the aircraft 100 from a defined origin point corresponding to the takeoff point. Similarly, the demarcation between climb and cruise phases may be based on relative altitude as compared to the desired cruising altitude and/or a distance delta from the desired flight path. Based on the defined phase or segment, the flight control system 134 may translate control input received through the control yoke 302 into flight control and thrust response, adjusting the rotor speeds and angles of the thrust sources 102 and corresponding main struts 106. Flight control programming may adjust for feedback, allowing the flight control system 134 to translate control input from the pilot into control output executed by aircraft components without the need for distinct trim control or the use of control surfaces (e.g., flaps, ailerons, etc.)

Low Velocity/Low Altitude Safety Wing-Chute System for VTOL Aircraft

VTOL aircraft, like any aircraft, may experience engine or control system failure at low altitudes (e.g., under 500 feet). The design and implementation of a means for protecting the aircraft and its occupants (as well as third parties who may be endangered by a crash) may be particularly challenging at low altitudes. For example, the capacity of the airframe to absorb collision energy (e.g., associated with impact with the ground or with other obstacles) may be limited (e.g., by the need for a lightweight airframe). However, low-altitude system failure allows minimal time for the aircraft to reduce its speed or momentum, and thereby decrease its kinetic energy. Some aircraft designs may attempt to prevent a collision by including auxiliary or backup engines deployable in the event of a failure of the main engine/s, e.g., capable of transferring power to a common shaft driving main propellers. However, the use of backup engines or powerplants adds complexity, increasing both initial costs (e.g., design and construction) as well as operating and maintenance expenses. Helicopters (and some small fixed-wing aircraft; e.g., the Cirrus Airframe Parachute System, or CAPS) may incorporate a ballistic chute system which deploys either manually or automatically, launching a small rocket to propel one or more parachutes above the aircraft to slow its descent. However, such a chute system may be subject to periodic and expensive inspections. Additionally, the propellant may be hazardous to occupants or to third parties due to its volatility or propensity for unintentional detonation.

Figure 10:
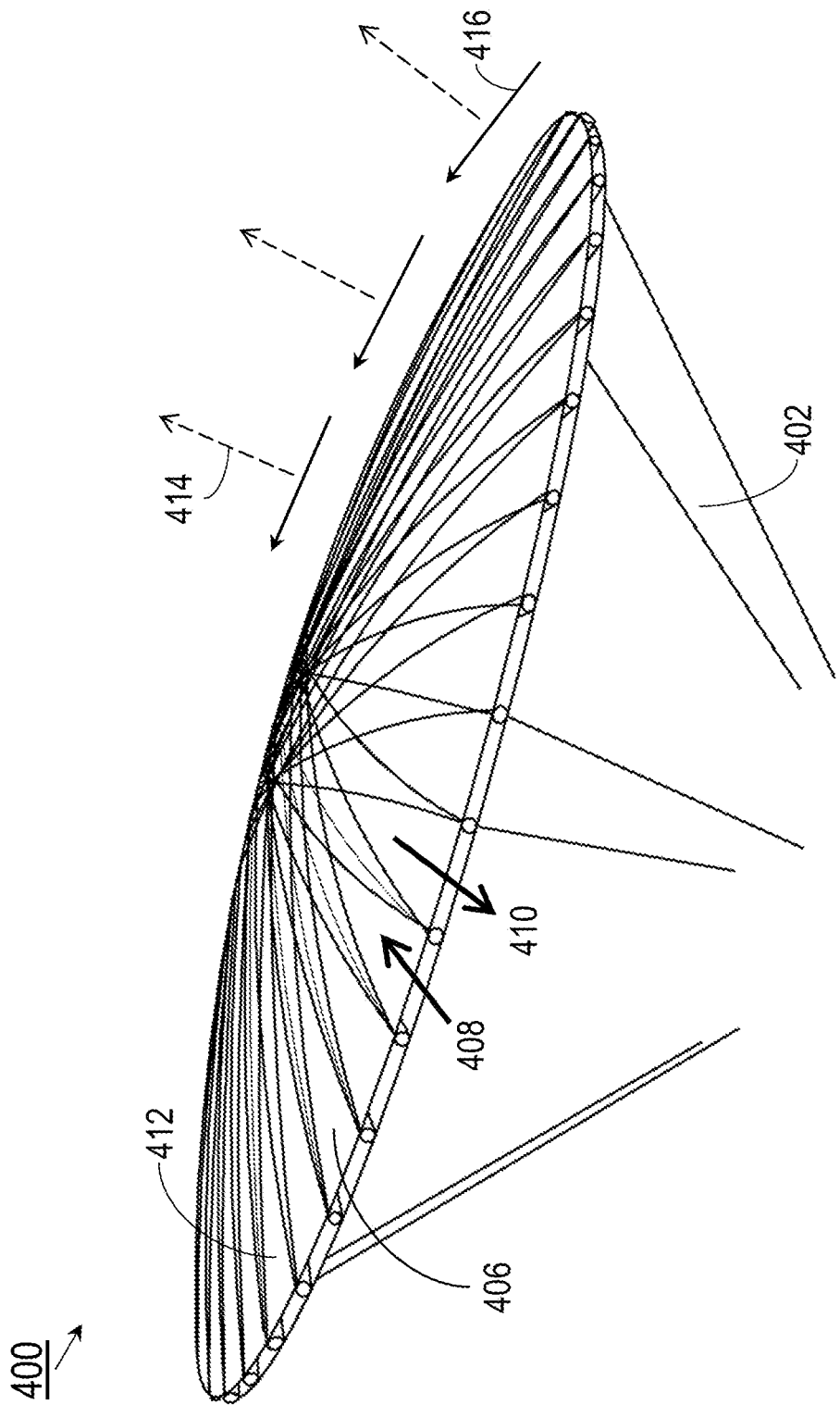
FIG. 10 illustrates an exemplary embodiment of a wing-chute system compatible with the VTOL aircraft of FIG. 1 according to the inventive concepts disclosed herein.
Figure 11A:
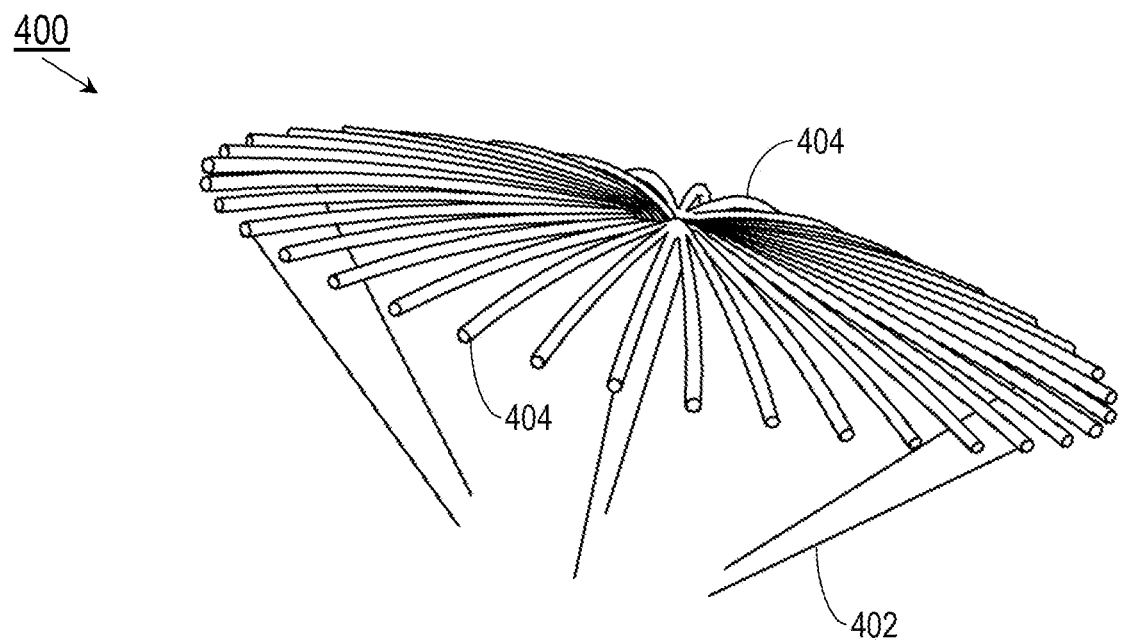
FIGS. 11A and 11B illustrate detailed views of the wing-chute system of FIG. 10.
Figure 11B:
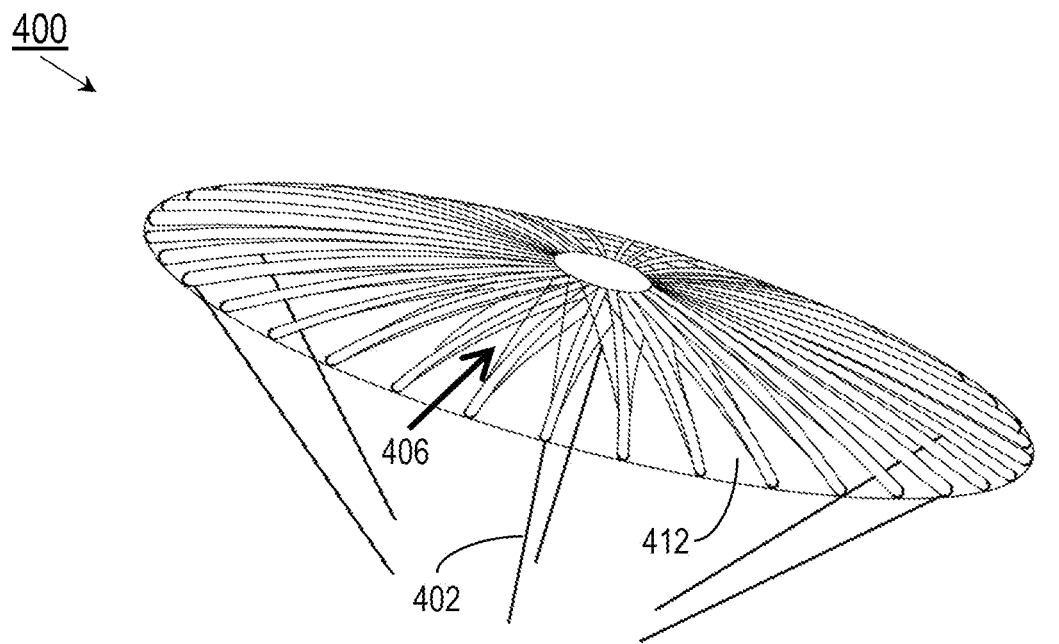

Referring generally to FIGS. 10, 11A, and 11B, embodiments of the inventive concepts disclosed herein may be directed to an exemplary embodiment of a low-cost, lightweight, and mechanically simple deployable wingchute system 400 compatible with the VTOL aircraft system 100. The deployable wingchute system 400 may further be compatible with a broad variety of vehicle configurations, attitudes, and velocities and with a wide range of atmospheric conditions. The wingchute 400 may be incorporated into the fuselage 104 of the aircraft 100 and deployed, either manually by the pilot (e.g., onboard the aircraft or by a remote operator) or automatically by the flight control system 134 if a system failure or imminent low-altitude collision (e.g., with the ground or a ground-based obstacle) is detected. Once deployed, the wingchute 400 may remain attached to the aircraft 100 by cables (402) spaced or positioned to minimize emergency impact of the aircraft with a reinforced or impact-absorbing structure, e.g., a stabilizing surface 126 or dorsally mounted strut 128 as described above.

The wingchute 400 may be initially inflated (e.g., upon deployment) by electronic ignition of a chemical propellant (e.g., sodium azide, cupric oxide (CuO), or any appropriate airbag-type propellants) via a fast-reacting igniter such as barium potassium nitrate. The wingchute 400 may incorporate a single propellant or distribute the propellant throughout segments of the wingchute, such that selective or successive ignition or one or more segments may be used to control the rate of inflation of the wingchute. The wingchute 400 may include a central self-inflatable portion and/or a series of inflatable ribs (404) spreading radially from the center of the wingchute (e.g., alternating with ram-air inlets 406 as described below).

Once deployed, inflation of the wingchute 400 may be aided by ram-air inlets 406 disposed around the circumference of the wingchute in a spaced apart relationship. The ram-air inlets 406 may open to accommodate relative airflow into the wingchute (408), and taper inward to provide an aerodynamic profile in the event of relative airflow out of the wingchute (410; e.g., from the horizontal center toward the outer circumference). The deployed shape of the wingchute 400 (from an overhead perspective, relative to a vertical or z-axis) may be circular or near-circular, e.g., a multi-sided polygon approximating a circle). The exterior "skin" 412 (e.g., canopy) of the wingchute 400 may be manufactured from a high strength lightweight synthetic fiber (e.g., Type 6,6 nylon) stitched and sealed so as to provide an airtight seal for any self-inflating compartments (e.g., central or radial). For example, the ram-air inlets 406 may open to allow relative airflow 408 into the wingchute between upper and lower layers of exterior skin 412.

The superstructure of the deployed wingchute 400 may present a wing shape in order to provide lift in the event of relative airflow. For example, if the forward (horizontal) speed of the aircraft relative to the ground is negligible but there is sufficient ambient wind, the shape of the wingchute 400 may provide lifting force (416) perpendicular to the relative airflow (418). If relative airflow is vertical (e.g., vertical descent of the aircraft with negligible vertical wind), the wingchute 400 may produce vertical drag force in the manner of a conventional parachute. Either or both of the aforementioned lifting force (416) and vertical drag may act to reduce the vertical descent speed of the aircraft 100, individually or in combination.

Directional Thrust and Lift Control Via Segmented Annular Wing

Figure 12A:
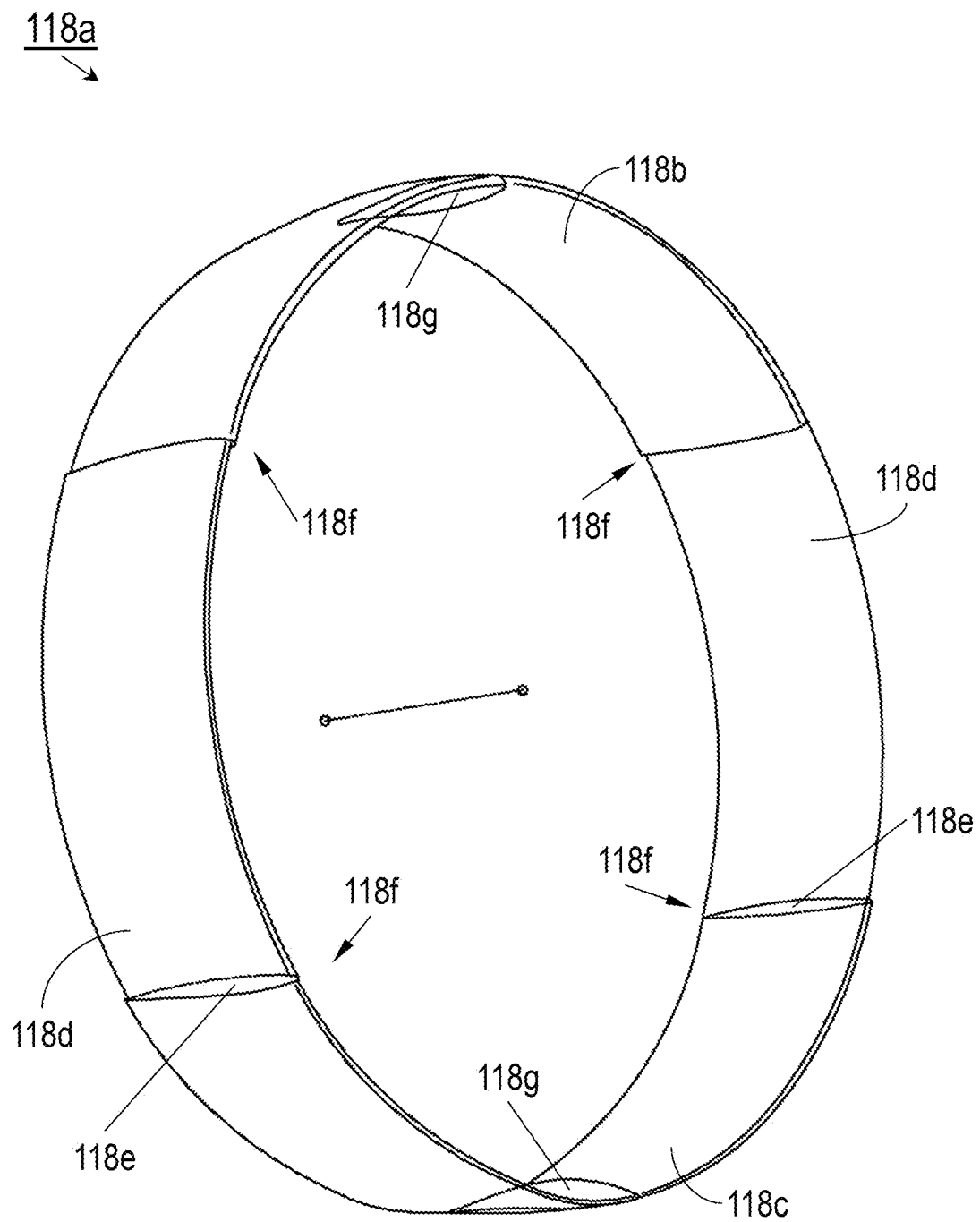
FIG. 12A illustrates lateral perspective views of a segmented annular wing of the VTOL aircraft of FIG. 1.
Figure 12B:
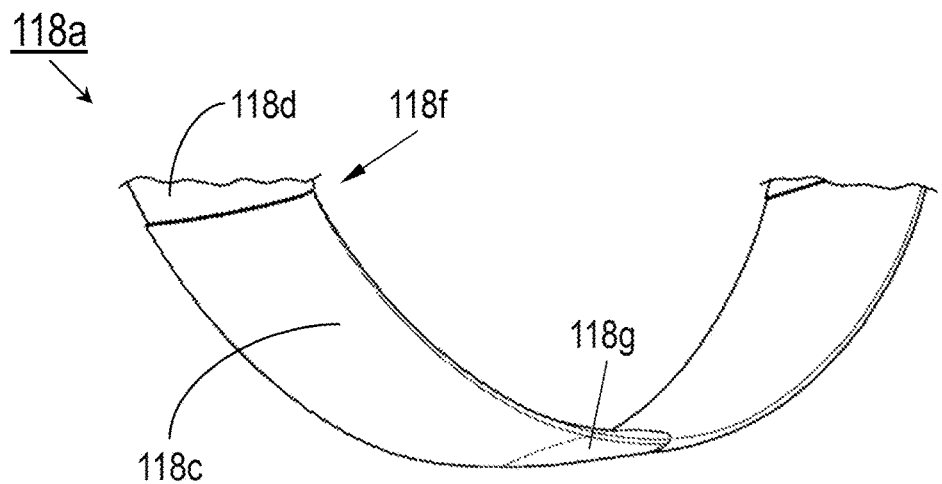
FIG. 12B illustrates a lateral perspective view of a lower segment of the segmented annular wing of FIG. 12A.
Figure 12C:
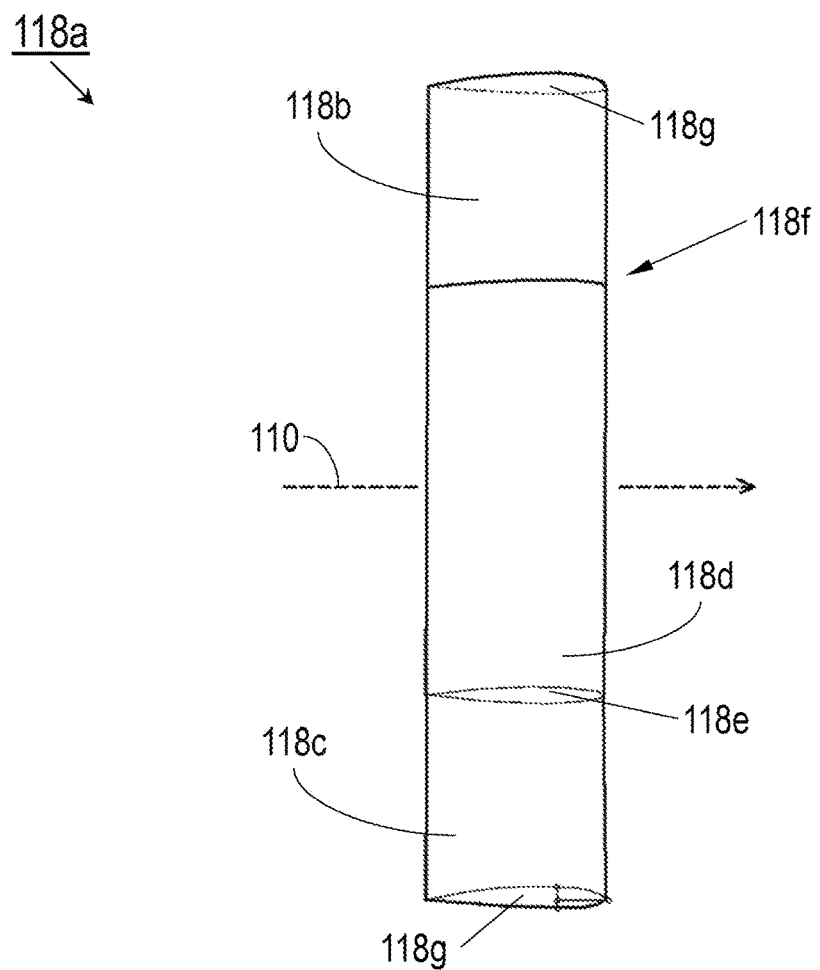
FIG. 12C provides a lateral view of the segmented annular wing of FIG. 12A.

Referring now to FIGS. 12A through 12C, the annular wing 118a may be implemented and may function similarly to the annular wing 118 of FIG. 6, except that the annular wing 118a may be segmented to optimize directional thrust. For example, variably directing generated thrust, e.g., shifting the directional component of the thrust vector of an aircraft system between a predominantly vertical lift component and a partially horizontal (substantially parallel to the ground plane) component may be essential for successful VTOL operations involving a substantially vertical takeoff and landing, substantially horizontal directional flight, and a safe, smooth transition between the two modes or phases. However, directional flight may be difficult to achieve efficiently, at least in terms of conserving weight, avoiding complexity (e.g., computer-controlled actuators), simplifying control operations, and minimizing manufacturing and operating costs.

Referring in particular to FIG. 12A, the annular wing 118a may be attached to the auxiliary struts (structural members) 124 and main strut 106 (FIG. 6), over which the exterior aliform "skin" of the auxiliary struts 124 and main struts 106 (see, e.g., FIG. 1) may be overlaid. Similarly, the auxiliary struts 124 and main strut 106 may support a rotor shaft (122, FIG. 1) which the propeller blades 108 of each thrust source 102 (see, e.g., FIG. 1) are attached to and driven around.

The annular wing 118a may be segmented into upper and lower segments 118b-c and side segments 118d. For example, the side segments 118c may present a symmetrical airfoil profile 118e. The profile of each segment may be blended to provide a smooth geometric surface near the change of cross section (118f) of each segment. Referring in particular to FIG. 12B, the upper and lower segments 118b-c may present an airfoil profile 118g for maximizing lift, and minimizing drag, during cruising and directional-flight phases and configurations of the VTOL aircraft 100 as shown by, e.g., FIGS. 3-4. Accordingly, directional flight control in cruising phases may be affected by articulating the annular wing 118a relative to the main strut 106 as disclosed above (see, e.g., FIG. 6). The high airflow over the upper and lower segments 118b-c (e.g., substantially parallel to the rotor axis 110 and the longitudinal axis of the thrust source 102) may increase the generated lift force over both the upper and lower segments 118b-c in response to an adjustment of the orientation/angle of the annular wing 118a (e.g., via the linear actuators 120a-c, FIG. 6) relative to the airflow through the thrust source 102.

When the VTOL aircraft 110 is in a hovering configuration for takeoff and landing (see, e.g., FIGS. 1 and 2), the annular wing 118a may also provide enhanced lift via the aliform upper and lower segments 118b-c as noted above, as well as improved thrust vectoring by shifting in orientation angle relative to the propeller blades 108 and rotor axis 110 (rotor shaft 122, FIG. 1), advantageously directing exhaust and outflow of the thrust source 102 to provide a degree of lateral flight control during vertical flight and hovering operations.

Navigation and Control Interface for VTOL Aircraft

As noted above, it may be difficult to design a control interface for a VTOL aircraft as disclosed herein that is at once easy to learn and manage for novice pilots, intuitive for experienced pilots, and of moderate complexity, weight, and cost. Furthermore, the navigational counterpart to such a control interface—in other words, the means by which the VTOL aircraft determines its destination and delivers its passengers thereto while accounting for air and ground traffic, weather and atmospheric conditions, fuel capacity, and potential emergencies along the way. Conventional air traffic, for example, involves a great deal of pre-flight planning and real-time monitoring of traffic to ensure safe separation.

Figure 13A:
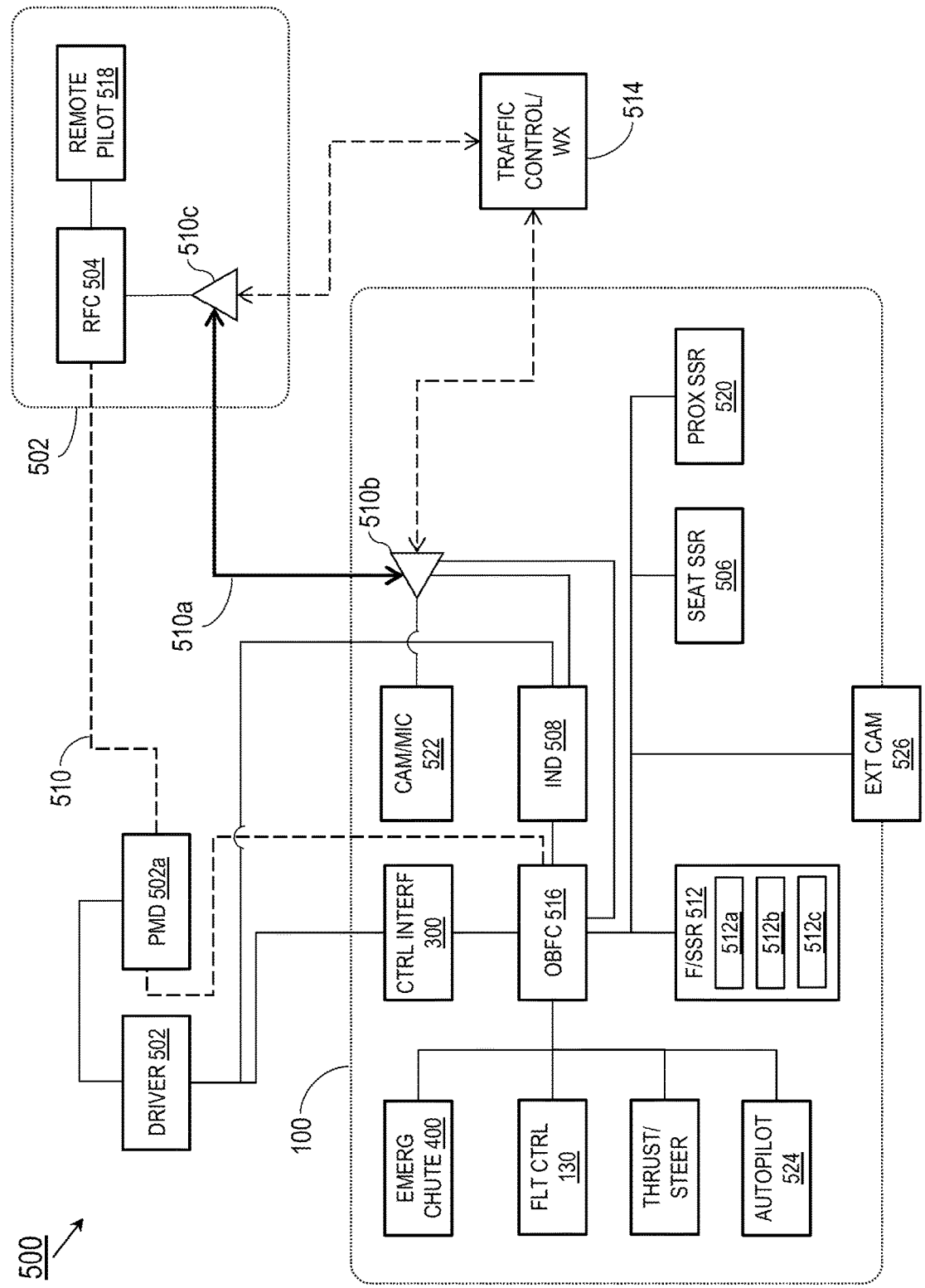
FIG. 13A is a diagrammatic illustration of a navigation and control interface compatible with the VTOL aircraft of FIG. 1.

Referring to FIG. 13A, embodiments of the inventive concepts disclosed herein are directed to a navigation and control interface (NCI) 500 compatible with the VTOL aircraft and other components disclosed herein (e.g., the control interface 300 and control yoke 302, the deployable wingchute system 400). For example, a driver 502 (e.g., user, pilot; the driver may be accompanied by passenger/s) in need of a vehicle may inquire as the location of a nearby VTOL aircraft 100, or request such a vehicle by contacting a remote flight computer 504 (RFC) via a personal mobile communication device 502a (e.g., smartphone, tablet) equipped with the appropriate software and peripherals. The RFC 504 may (based on location information received by the driver 502) determine the locations of proximate aircraft and send these locations to the user, inviting the user to reserve the use of a particular vehicle and proceed to its current location (which may include a landing site, a refueling site, and/or a maintenance site).

Once the driver 502 has arrived at the designated location and boarded the VTOL aircraft 100, the NCI 500 may confirm the presence of the user (and any passengers) via seat-based sensors 506. For example, seat-based sensors 506 may include weight sensors, e.g., strain gauges configured to measure applied voltage differences caused by the weight of the pilot/passengers in their seats. Activation of the VTOL aircraft 100 may be prevented if no weight is detected by the pilot's seat; otherwise, the seat-based sensors 506 may estimate the weight of the driver 502 and any passengers (if the VTOL aircraft 100 includes a cargo compartment, additional sensors therein may determine any additional payload weight) and forward this information to the RFC 504 for flight plan and range calculations. Once the presence of the driver 502 is confirmed, the NCI 500 may invite the pilot to activate the VTOL aircraft 100 via an interactive navigation display (IND) (508), e.g., via dedicated on/off switch or button. For example, the IND 508 may serve as the primary interface between the driver 502 and the onboard flight computer (516), displaying selected outputs of the OBFC (including information forwarded by the remote pilot 518, for which the OBFC 516 serves as an interface. Once the IND 508 has been activated, the NCI 500 may request a passcode or similar security element previously sent to the user's PMD 502a, or the NCI may recognize the user is present by a radio link (510) between the NCI and the user's PMD 502a, by comparing pretransmitted sent cryptographic digital certificates on the PMD and the NCI 500. The IND 508 may include an organic LED (OLED)-based display surface incorporating a capacitive grid, such that the driver 502 may interact with, and enter additional data into, an activated IND 508, via the capacitive display surface or touchscreen. For example, the IND 508 may display an alphanumeric keyboard, e.g., so that the driver 502 may enter the appropriate passcode to activate the VTOL aircraft 100 for temporary use. The IND 508 may then request from the driver 502 a destination, also entered via the touchscreen. The destination may be entered in a variety of ways, e.g., by street address, latitude/longitude, or other coordinate systems. If, for example, a partial address (e.g., a city and state) is entered, the IND 508 may attempt to autocomplete the entry with a dedicated landing facility proximate to the partial entry. Once the user entry has been cross-referenced with a precise location, the RFC 504 may determine whether the destination is possible and, if so, generate a flight plan. For example, the RFC 504 may take into account the desired destination, the reported weight of the driver 502, passengers and cargo, and current fuel capacity as determined by onboard fuel sensors (512).

Fuel Check System

Figure 13B:
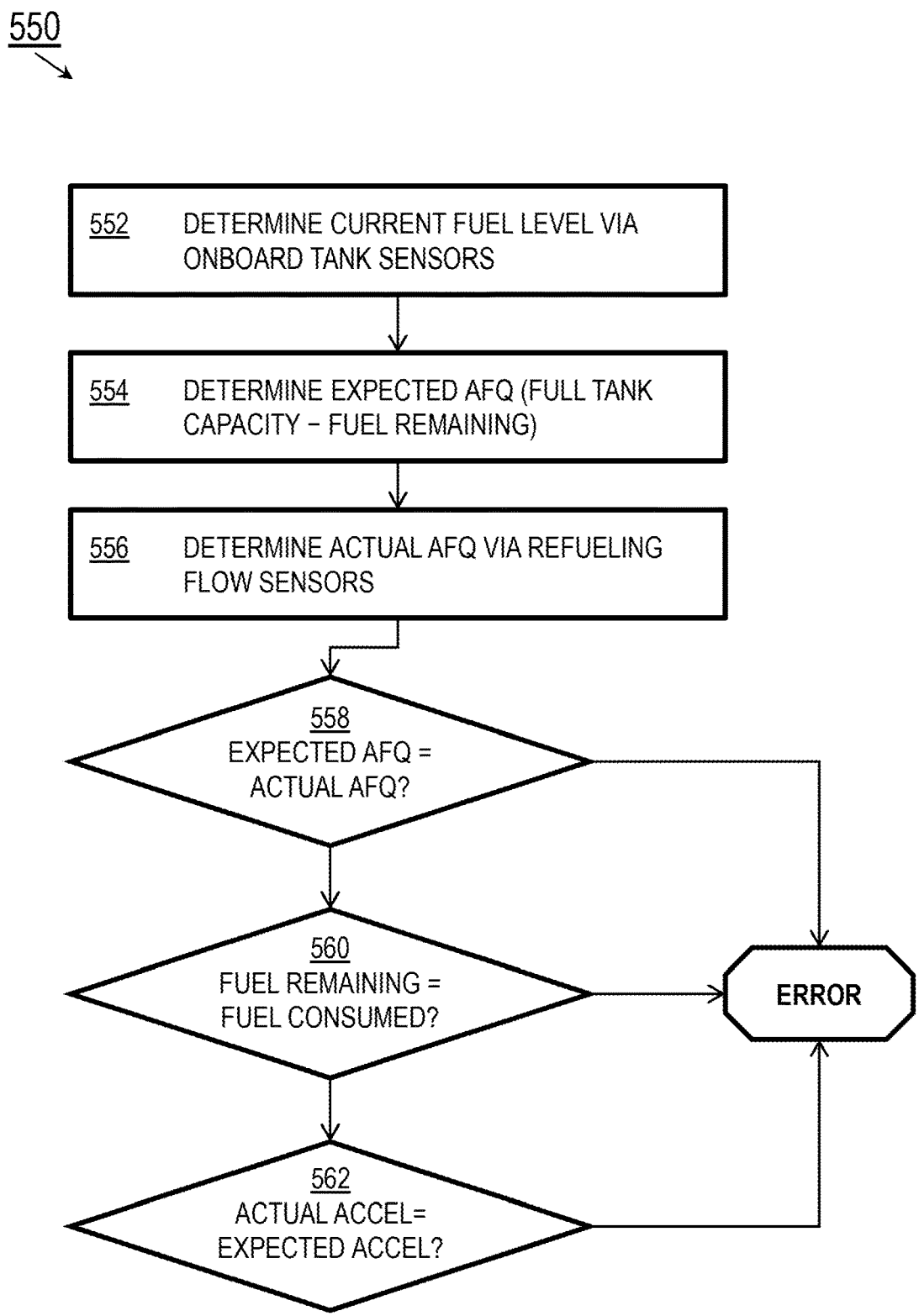
FIG. 13B is a process flow diagram of operations of the navigation and control interface of FIG. 13A.

Fuel sensors 512 of the VTOL aircraft 100 may include onboard fuel tank sensors (512a), engine fuel flow sensors (512b), and refueling flow sensors (512c). Referring also to FIG. 13B, a triple check system (550) is used to avoid fuel calculation errors which are known in the industry to occasionally cause accidents. At a step 552, the onboard flight computer 516 (OBFC) determines the current fuel level as measured by the onboard fuel tank sensors (512a). At a step 554, the OBFC 516 determines the expected additional fuel quantity (AFQ), or the amount of fuel expected to be added during refueling. For example, the expected AFQ may be defined as the full-tank capacity of the VTOL aircraft 100 minus the fuel quantity remaining from the previous flight. At a step 556, the actual AFQ, or the fuel added during the refueling process is measured as it flows into the refueling pipe by the refueling flow sensors (512c). At a step 558, the expected AFQ and actual AFQ are compared by the OBFC 516 to confirm that the two quantities are indeed equal; if there is a discrepancy between the expected and actual AFQ, the OBFC 516 may generate an error, delaying take-off until the discrepancy is addressed and resolved. At a step 560, the fuel quantity remaining from the previous flight is checked against fuel consumed as measured by the engine fuel flow sensors (512b); if there is a discrepancy between these two quantities, the OBFC 516 may similarly generate an error and inhibit take-off. At an additional step 562, the OBFC 516 may additionally review flight data of the immediately previous flight, comparing actual vehicle accelerations against expected accelerations for known thrust conditions; any discrepancies may likewise trigger a fault condition that inhibits take-off. The RFC 504 may request updated air traffic and weather data from the nearest traffic control facility (514).

Based on the available fuel, weight, weather, and traffic data, the RFC 504 may attempt to generate a flight plan based on the user's intended destination. The RFC 504, which may be in communication with the OBFC 516 via radio-based high integrity datalink (510a) between transceivers/routers (510b-c) on board the VTOL aircraft 100a and proximate to the RFC), may observe predetermined flight plan guidelines in the calculation of a flight plan from the current location to the user's selected destination. For example:

Route altitudes may be based on predetermined regulatory altitudes and preselected or pre-approved ground tracks.

Routes may prioritize the circumvention of high population areas.

Routes may minimize operating noise and risk to ground personnel by following major roadways whenever possible.

Routes may calculate actual and forecast traffic along the route based on a set departure time and a set envelope size (e.g., around any traffic within 3 miles of an estimated vehicle position along the route).

Routes may plan around any actual or forecast weather systems associated with forward visibility<10 km (~6.2 mi), winds of vertical change>15 kts/10,000 ft, or any applicable regulatory criteria.

Routes may prioritize a minimum flight segment length, e.g., 1 nautical mile (NM).

Based on the above factors, the NCI 500 may determine a route, a cruising altitude, and an estimated flying time to the desired destination. For example, given a departure point and destination landing zone at 0 feet AGL, a ground track of 90 degrees magnetic, a cruising altitude of 3,000 feet may be selected. If the destination can be reached without refueling, the required fuel to reach the destination, alternate landing zones along the route, and the reserve fuel may be calculated. If refueling is required, the route may incorporate one or more refueling stops, or the pilot may be notified and invited to select an alternative vehicle or refuel the vehicle, if this can be accomplished at the current location of the VTOL aircraft 100. The route includes 2 alternate landing areas, e.g., if the primary destination and first alternate destination are not available upon arrival. Additionally, the availability of enroute landing areas may be updated and periodically sent from the RFC 504 to the NCI 500 before and during flight.

If a flight plan is successfully generated, the RFC 504 may submit the flight plan to the traffic control facility 514 for clearance while crosschecking components of the NCI 500 and other components and systems of the VTOL aircraft 100 (e.g., fuel systems, the flight control system 134, actuators and microcontrollers, the emergency chute system 400 and other emergency features, updated weather and traffic data, the datalink 510a, the RFC 504, as well as the availability and alertness of a remote pilot (518) and the suitability of the takeoff, landing and alternate landing areas. For example, proximity sensors 520 (e.g., thermal/IR sensors) may survey the immediate proximity of the VTOL aircraft 100 to confirm that no persons are present outside the aircraft or immediately proximate thereto. The driver 502 may, via the personal mobile device, photographically survey the takeoff area; these photographs, along with accelerometer data cross-referenced to each photograph to determine its perspective, may be assessed by software on the PMD 502a to identify any potential obstacles in the vertical ascent corridor of the VTOL aircraft 100 and the quality/angle of the ground surface. (A PMD 502a may similarly be used by the driver 502 or another person to assess the descent corridor and landing site before flight, and such information sent to the RFC 504.)

Similarly, the interior camera (522) may be activated briefly to confirm that the driver 502 is present (and alternatively, confirm the identity of the user). The interior camera 522 may include a microphone and speakers, and may be oriented so as to allow the driver 502 to communicate in real time with the remote pilot 518 (e.g., in the event of an emergency wherein the remote pilot may offer assistance or diagnostic support).

Once the driver 502 has assumed control of the flight plan and directed the VTOL aircraft 100 to ascend from the departure point to a safe transition altitude (e.g., via the control interface 300 and flight control system 134), the user may transition to directional flight and/or direct the flight control system 134 to engage full or partial autopilot (524), during which fine flight control will be managed by the flight control system and limited manual maneuvering may be possible. While inflight the IND 508 may display, e.g., flight plan progress, proximate weather (e.g., overlaid on a dynamic map), current airspeed and altitude, remaining fuel, time to destination, and available autopilot or manual flight options via the OBFC 516. For example, the driver 502 may access the OBFC 516 via the IND 508 and divert from the flight plan to execute a landing, e.g., with the authorization of the remote pilot 518 and at a pre-designated alternate landing zone, fuel stop, or the nearest landing zone/fuel stop to the current position of the VTOL aircraft 100. The RFC 504 will provide an updated list of available landing areas, or availability of the landing areas on a previously uploaded list. Similarly, the driver 502 may request an amendment to the flight plan by entering a new destination (which may be submitted to the traffic control facility 514 for clearance by the OBFC 516 or the RFC 504).

If the VTOL aircraft 100 should experience a system failure or other emergency inflight, the pilot may request (e.g., via the IND 508) emergency assistance from the remote pilot 518. For example, the remote pilot 518 may converse with the pilot, access diagnostic data from the OBFD 516 (via the RFC 504), and engage external cameras (526) to assess the exterior VTOL aircraft 100 for damage or failed components. The remote pilot 518 may assume control of the VTOL aircraft 100 and attempt to change the track, airspeed, altitude, or heading of the aircraft (e.g., in order to restore control or guide the aircraft towards an emergency landing or a spot where said landing would be safer). In the event that a guided emergency landing is impossible or impractical, the pilot or the remote pilot 518 may engage the deployable chute system (400) to minimize the impact of an emergency touchdown.

Figure 14A:
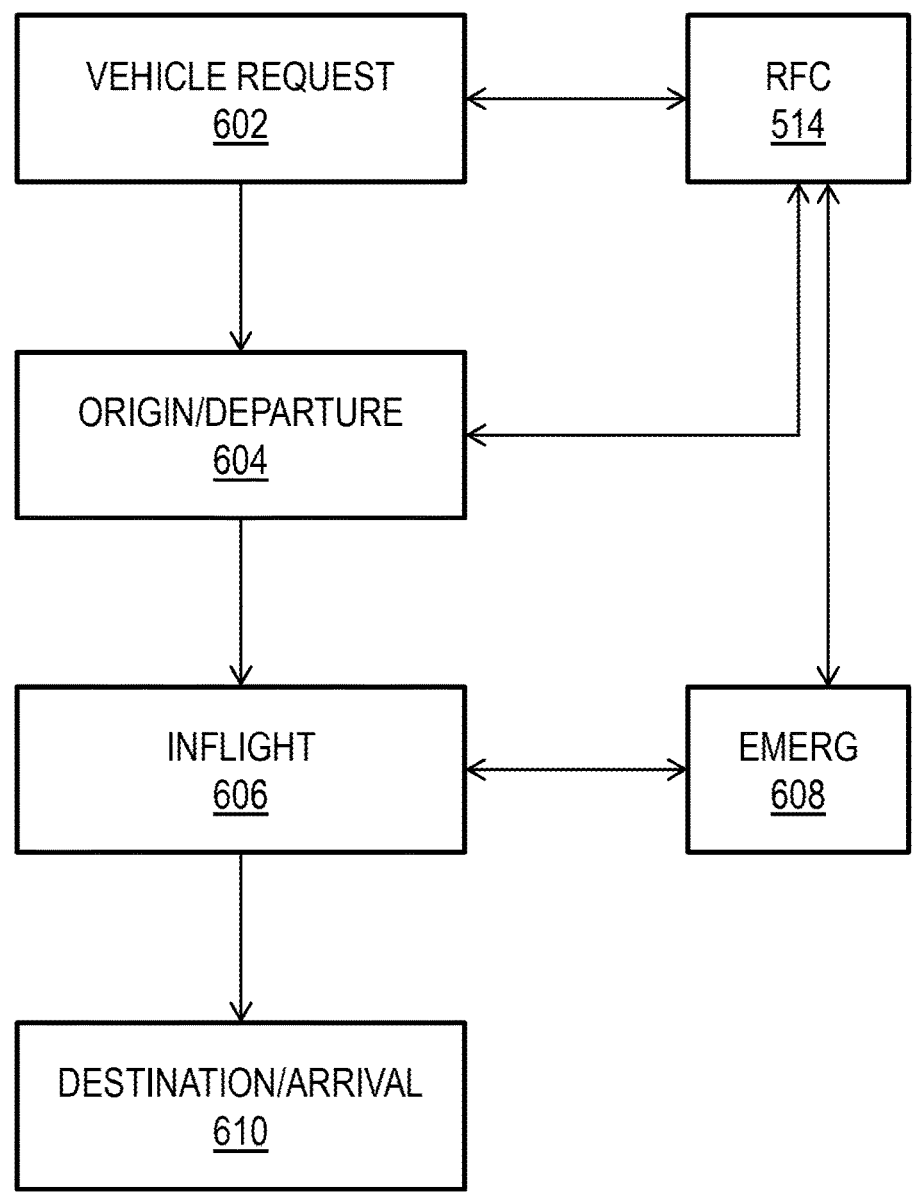
FIGS. 14A-K illustrate components and operational processes of the navigation and control system of FIG. 13A.

Referring to FIG. 14A, a process 600 by which the components of the NCI 500 (FIG. 13A) assist the driver 502 (FIG. 13A) in locating and operating the VTOL aircraft 100 (FIG. 13A) is shown. Broadly speaking, the driver 502 may request an available vehicle (602) from an RFC 504; locate, board, and activate the VTOL aircraft 100 for departure (604); cruise inflight (606); seek emergency assistance if necessary (608); and descend to a landing at the desired destination (610).

Figure 14B:
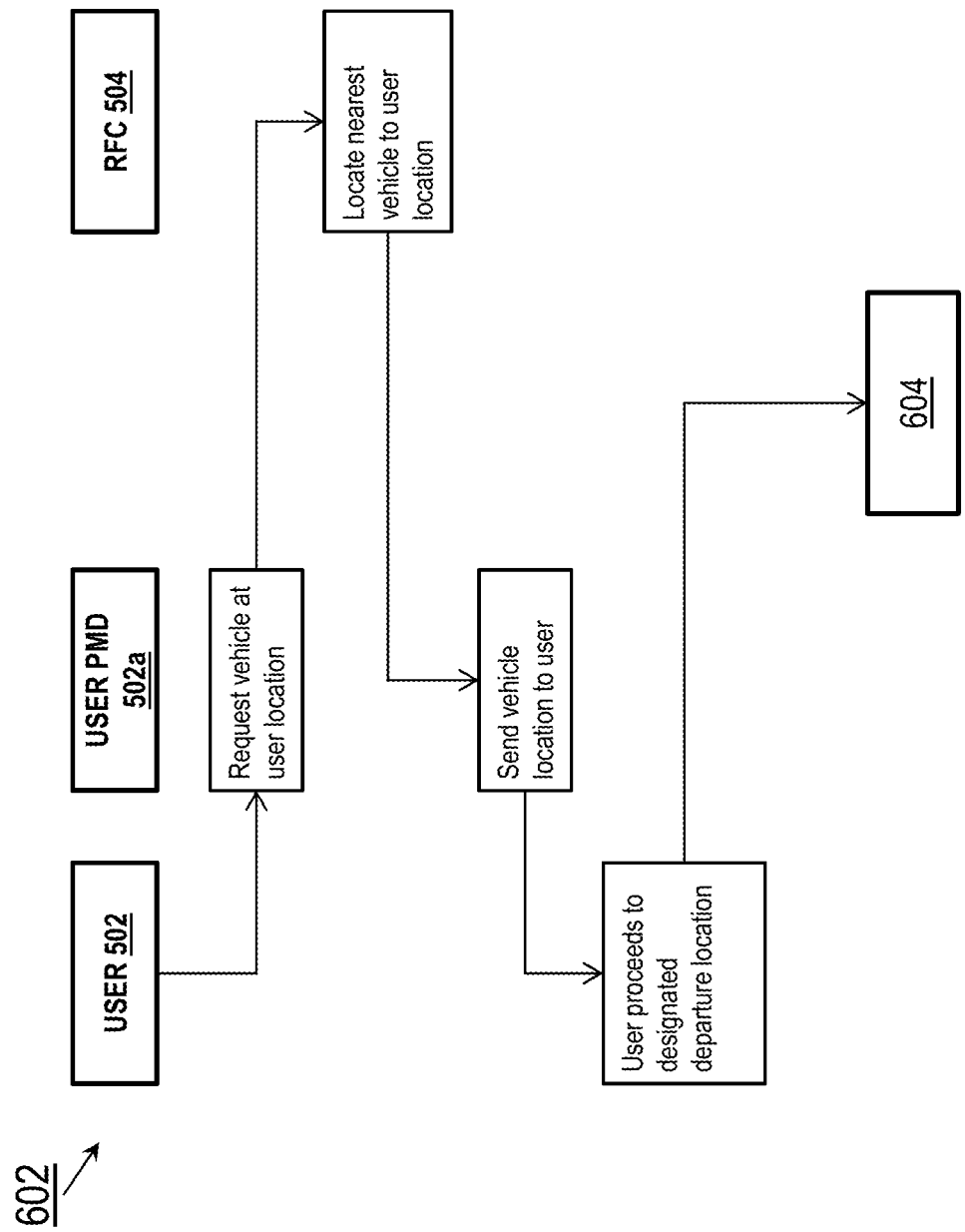

Referring to FIG. 14B, at the step 602, the driver 502 may request a vehicle via specialized software configured to execute on the PMD 502a. Once contacted by the PMD 502a, the RFC 504 may determine the closest available vehicle to the location provided by the driver 502. The RFC 504 may send this location to the PMD 502a along with directions for reaching the determined location.

Figure 14C:
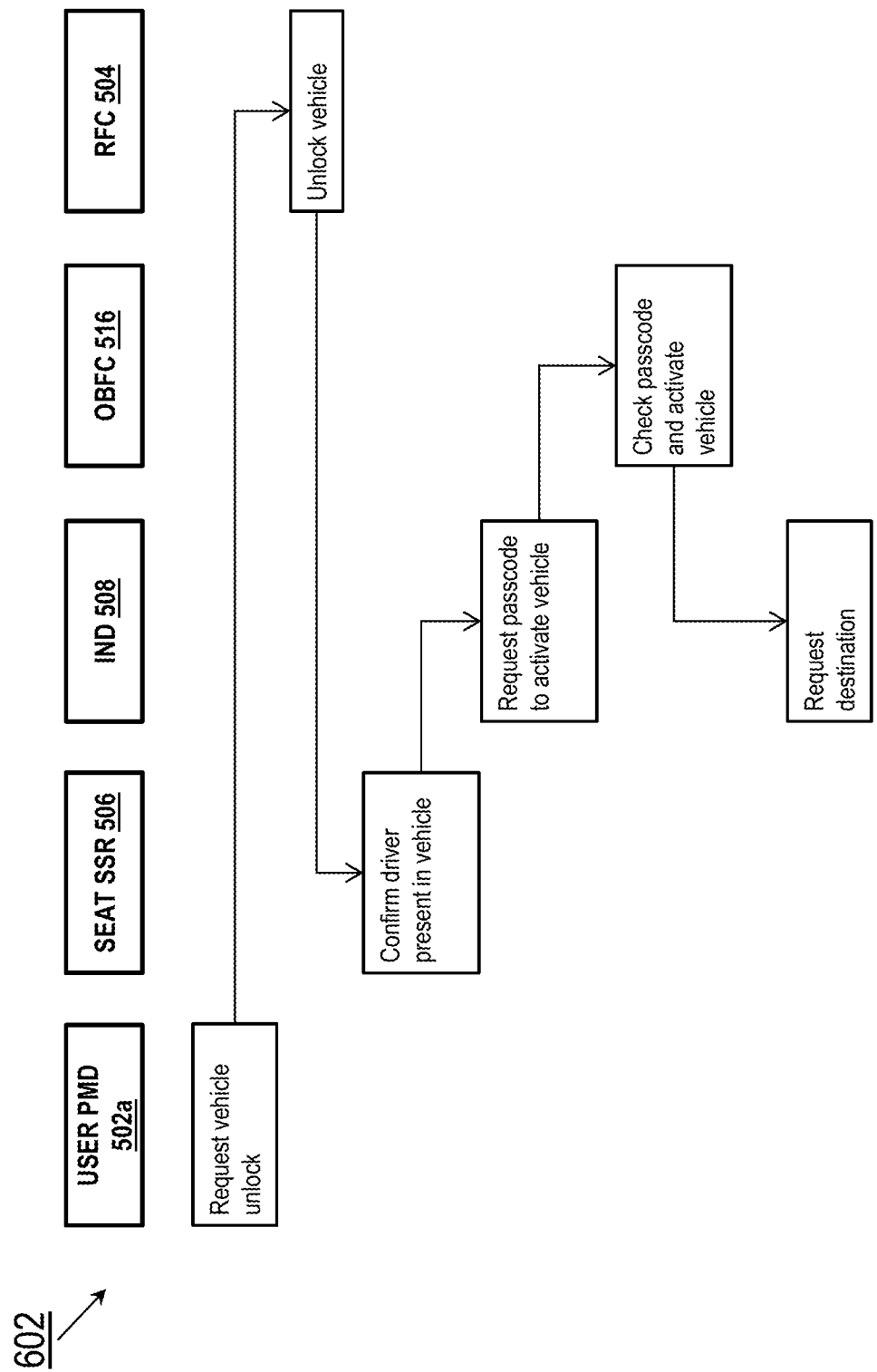

Referring to FIG. 14C, at the step 604, the driver 502, having arrived at the location designated by the RFC 504, may request (via the PMD 502a) that the VTOL aircraft 100 be unlocked by the RFC 504. Once the driver 502 (along with any passengers) is seated in the VTOL aircraft 100, the seat sensors 504 may confirm that the user is present, and the IND 508 will request from the user a passcode to activate the VTOL aircraft. The driver 502 (having been provided with this passcode by the RFC 504, e.g. upon receipt of directions to the VTOL aircraft 100) may enter this passcode via the IND 508 touchscreen; whereby the entered code will be checked by the OBFC 516 and, provided the entered code matches the official code, the aircraft will be activated. In some embodiments, the driver 502 may contact the RFC 504 from a point outside the VTOL aircraft 100 proper, and the RFC 504 will recognize the presence of the user's PMD 502a by comparing encrypted codes sent by the RFC 504 to the OBFC 516 and the PMD 502a and then simultaneously unlock and activate the aircraft.

Figure 14D:
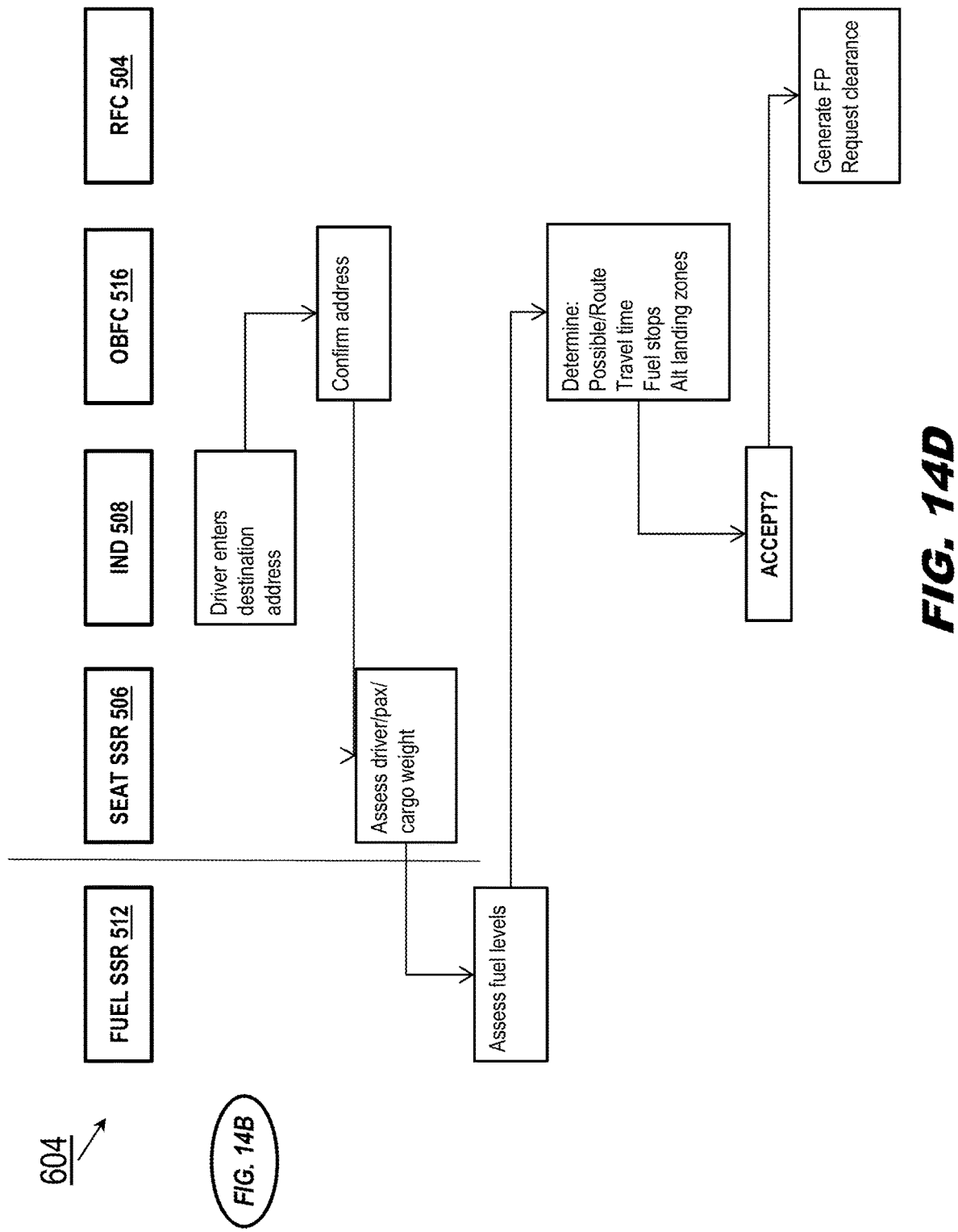

Referring now to FIG. 14D, the IND 508 may invite the driver 502 to enter a preferred destination. The driver 502 may do so in a variety of formats, e.g., street address, latitude/longitude, or any other appropriate coordinate system recognized by the IND 508. If, for example, the driver 502 enters a more general location such as a city or neighborhood, the IND 508 may attempt to autocomplete the entry by looking up and suggesting known departure facilities in, or proximate to, the city or neighborhood. The OBFC 516 may standardize the address and confirm the corresponding location, identifying a proximate location or facility suitable for landing and setting the identified location as the target destination. The destination confirmed, the seat sensors 504 may assess the added weight of the driver 502 and any passengers and cargo (above and beyond the weight of the VTOL aircraft 100 itself). The fuel sensors 512 may assess the current fuel capacity of the VTOL aircraft 100. Based on this information (along with any available weather and traffic information retrieved from the RFC 504), the OBFC 516 may determine if it is possible for the VTOL aircraft 100 to reach the target destination, and if so under what conditions, e.g., a preferred route; the estimated travel time for the preferred route; whether refueling is necessary and if so, where fuel stops should be made; and alternate landing zones along the route. The terms of the journey may be presented to the driver 502 by the IND 508 and, if the user accepts, the pertinent information may be forwarded to the RFC 504 for generation and submittal of a flight plan. In some embodiments, the RFC 504 may perform some or all of the above flight plan calculations based on data submitted by the OBFC 516.

Figure 14E:
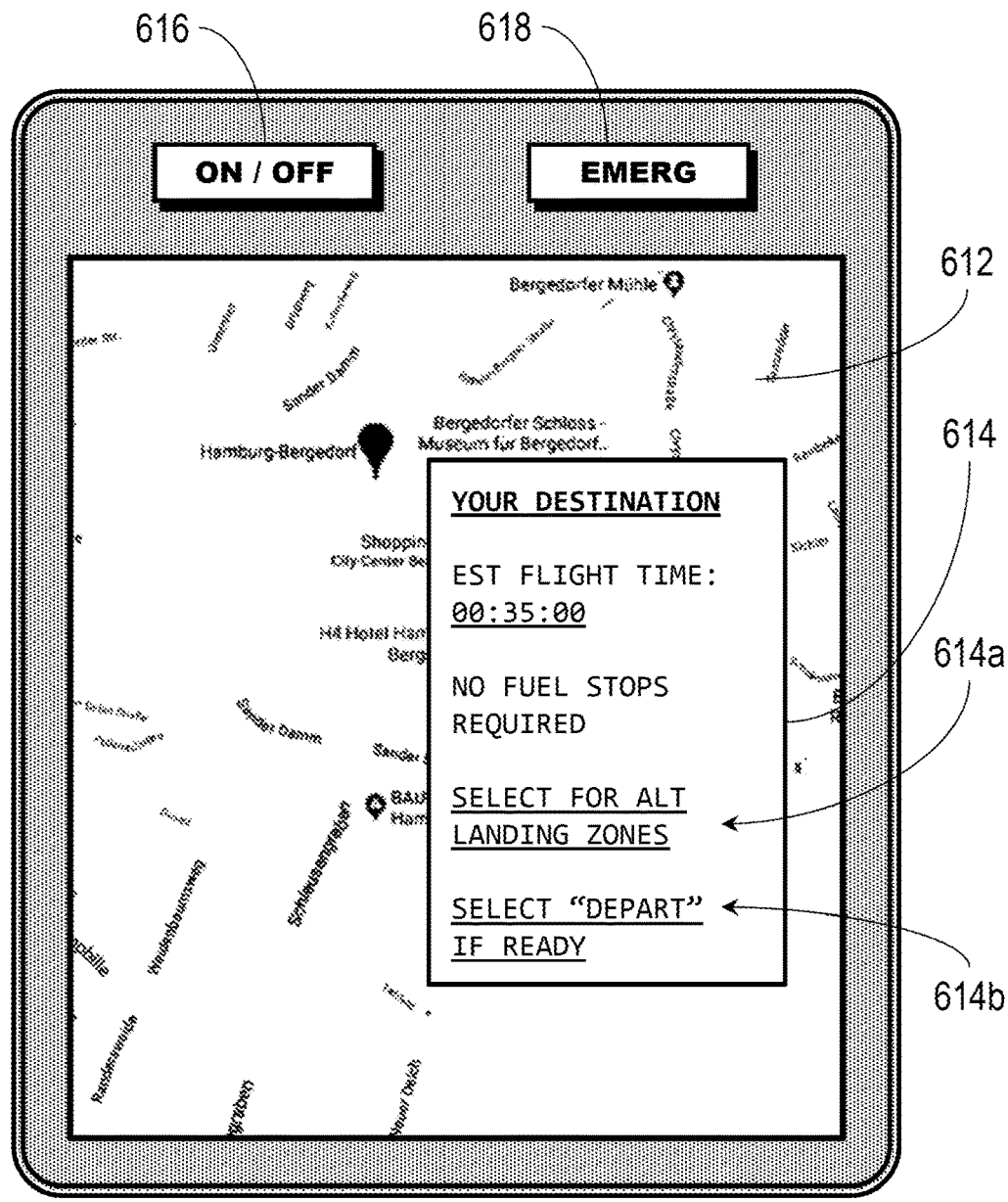

Referring to FIG. 14E, the IND 508a may be implemented and may function similarly to the IND 508 of FIG. 13A, except that the IND 508a may reflect the selection of a destination by the driver 502 and the corresponding generation of a route to the destination by the OBFC (516, FIG. 14D) for the user's acceptance. The IND 508a may have a display surface (612) partially or fully corresponding to a capacitive touchscreen, which may display static and moving maps corresponding to the route and destination along with selectable overlays (614) providing the projected flight time, clickable access to alternate landing zones (614a) and an option for the driver 502 to signal acceptance and readiness to depart (614b). The IND 508a may include dedicated buttons for, e.g., activation and deactivation (616) of the VTOL aircraft 100 as well as emergency assistance requests (618) from the RFC 504.

Figure 14F:
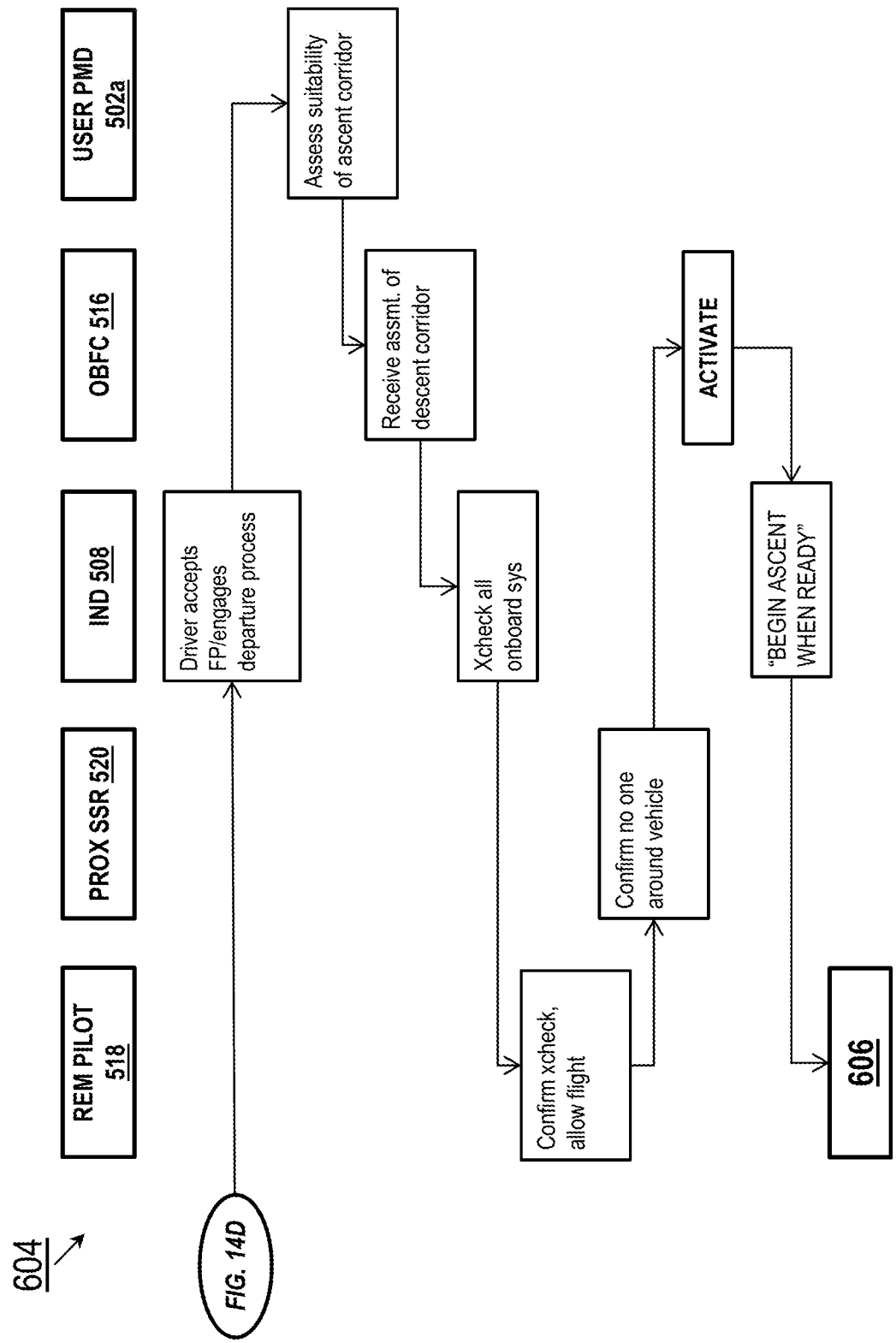

Referring now to FIG. 14F, if the driver 502 accepts the proffered route via the IND 508, the user may be prompted to assess the suitability of the ascent corridor via the PMD 502a as described above (e.g., via a series of photographs from recorded orientations). A similar assessment process (e.g., acceptable/unacceptable) may take place at the landing site with respect to the descent corridor (e.g., via a separate PMD at the landing site), and this information forwarded to the OBFC 516 by said PMD (via the RFC 504) for crosschecking by the driver 502 upon arrival above the landing site. The OBFC 516 may initiate a crosscheck of all flight systems (both onboard the VTOL aircraft 100 and remotely located) and, the crosscheck completed, confirm via proximity sensors 520 that no persons are within a predetermined range of the VTOL aircraft 100 (e.g., within a 1 m to 3 m radius) such that said persons might be adversely affected by a substantially vertical takeoff. The IND 508 may indicate a successful crosscheck and proximity check by signaling the driver 502 to ascend from the landing site (e.g., via the control interface 300). Once completed, crosscheck details may be forwarded to the remote pilot 518 for review and departure approval.

Figure 14G:
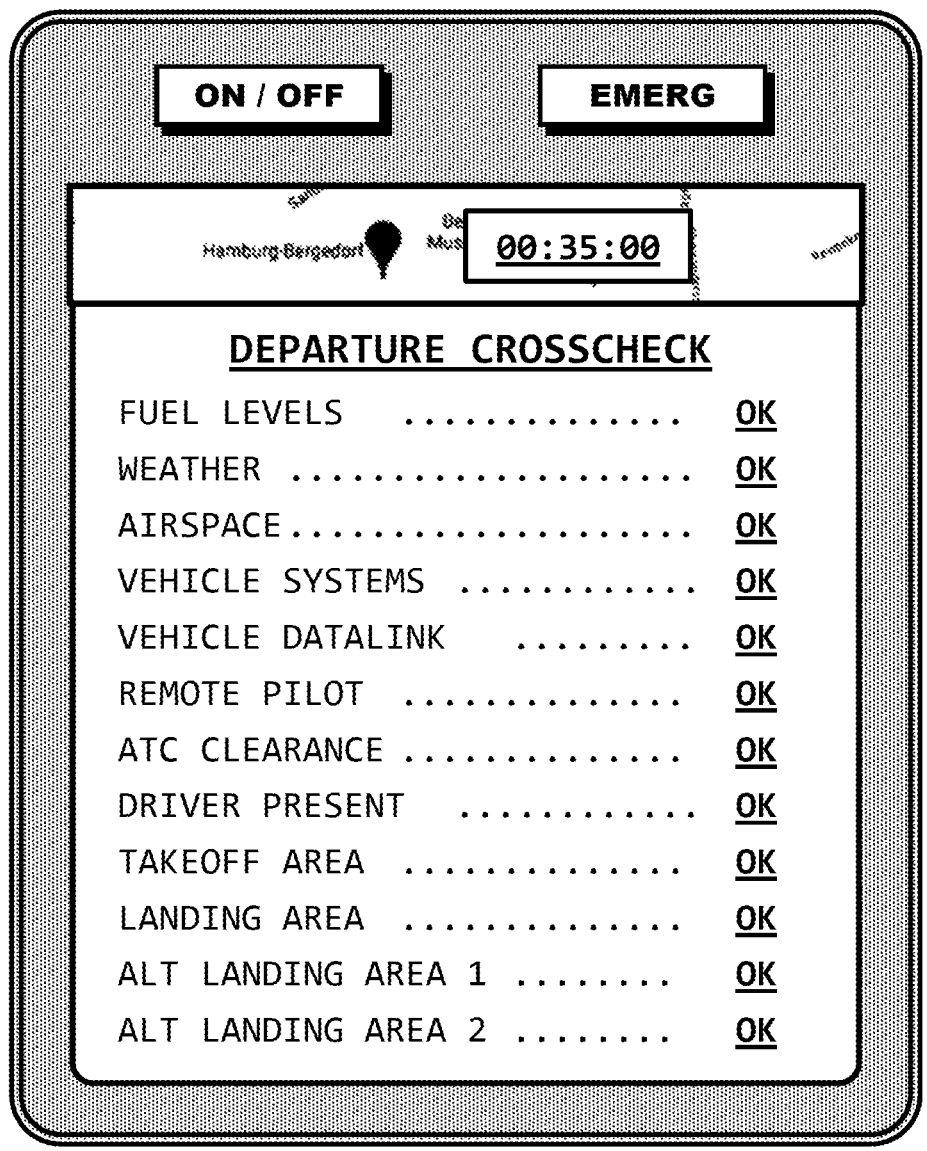

Referring now to FIG. 14G, the IND 508b may be implemented and may function similarly to the IND 508a of FIG. 14E, except that the IND 508b may indicate a successful preflight crosscheck by the OBFC 516. For example, the crosscheck may verify fuel levels and capacity; current weather and airspace conditions; onboard systems of the VTOL aircraft 100 and the datalink 510a; the presence of a remote pilot 518; air traffic clearance of the flight plan filed by the RFC 504; the seated presence of the driver 502; alternate landing areas; and the ascent and descent corridors at the respective takeoff and landing areas.

Figure 14H:
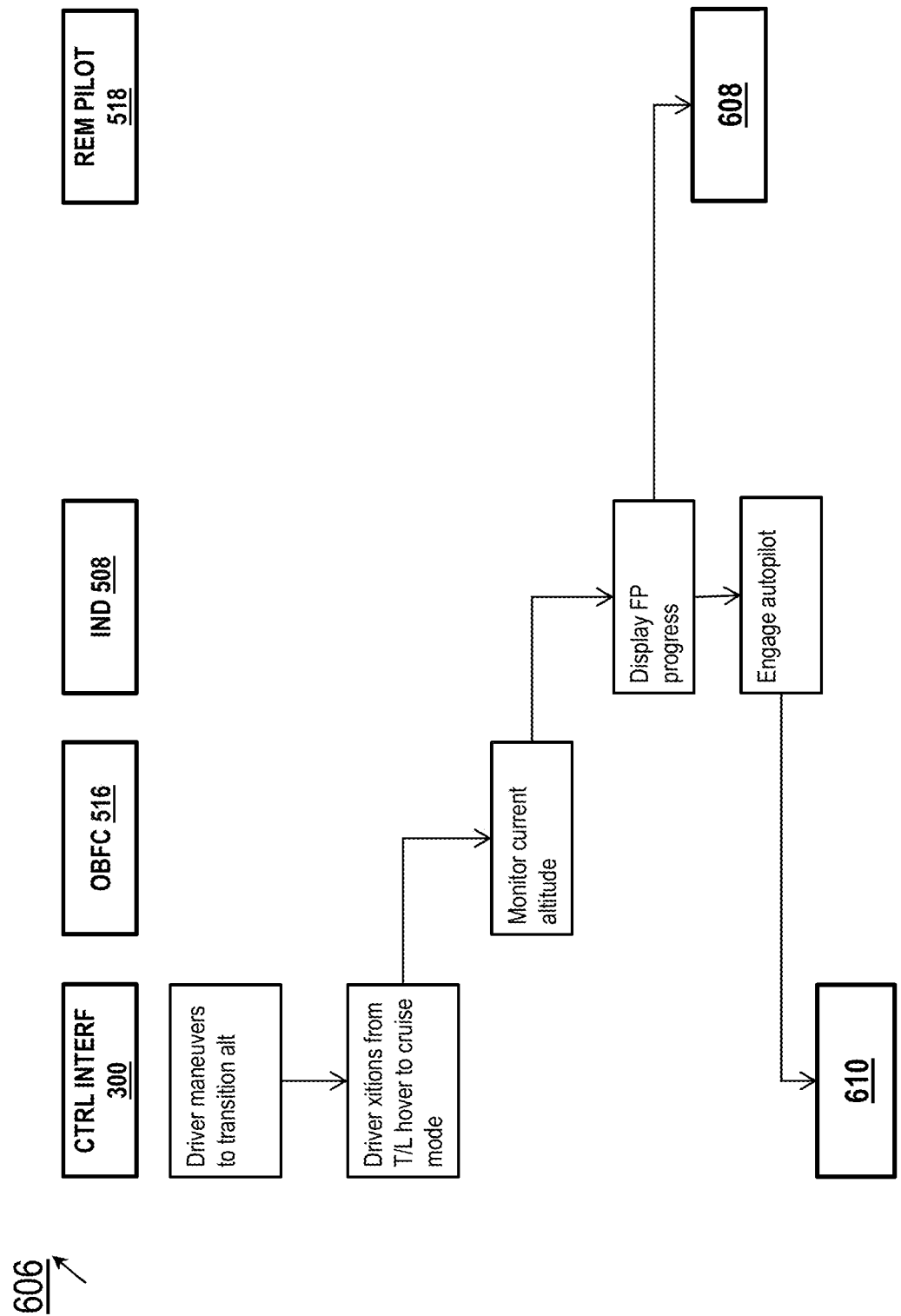

Referring to FIG. 14H, at the step 606 the driver 502 may transition the VTOL aircraft 100 from takeoff/hover mode to forward-flight/cruising mode (e.g., via the control interface 300) once the aircraft has ascended to a safe cruising altitude or predetermined height (e.g., 100 ft AGL). The VTOL aircraft 100 may proceed along the approved route toward the target destination, the OBFC 516 controlling the aircraft's current altitude, position, and velocity (displayed for the driver 502 via the IND 508), possibly in conjunction with the remote pilot 518. If an emergency occurs, e.g., failure of one or more onboard systems or unexpectedly adverse atmospheric conditions, the driver 502 may (via the emergency button 618, FIG. 14E) signal the remote pilot 518 for emergency assistance (608). Otherwise, depending on the altitude and atmospheric conditions, the OBFC 516 may engage autopilot systems (524), whereby the VTOL aircraft 100 may proceed along the route toward the destination (610) with limited manual maneuverability available via the control interface 300. The RFC 504 may continue to update weather, traffic, fuel stop, and alternate landing site information as the position of the VTOL aircraft 100 changes, forwarding updates to the OBFC 516.

Figure 14I:
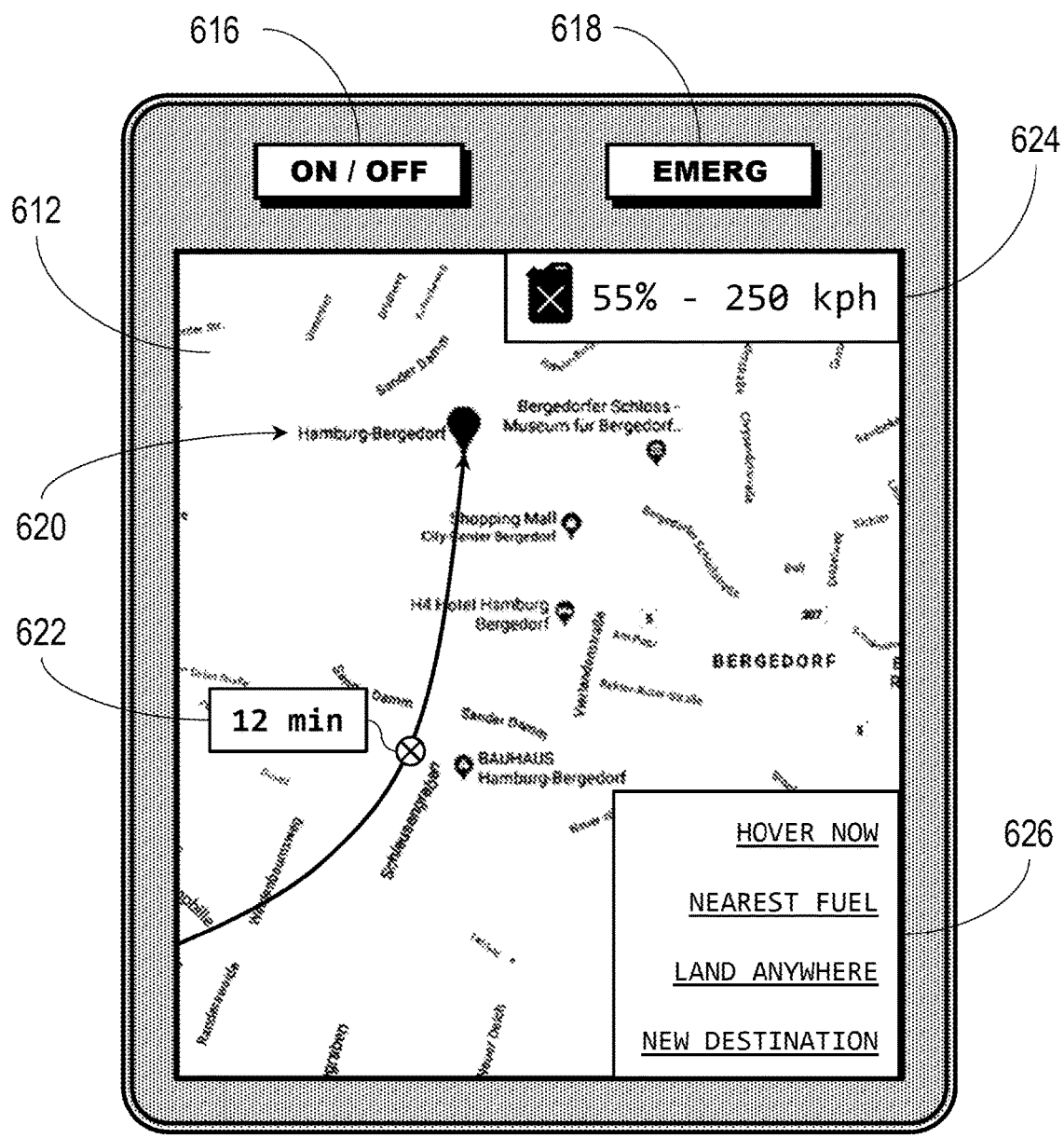

Referring now to FIG. 14I, the IND 508c may be implemented and may function similarly to the IND 508b of FIG. 14G, except that the IND 508c may indicate, via the display surface 612, progress inflight toward the target destination (620). The IND 508c may further display the estimated time remaining to touchdown (622) as well as the current airspeed and remaining fuel levels (624). In some embodiments, the overlaid airspeed and fuel levels (624) may be toggled to display additional pertinent information, e.g., the current altitude, air temperature, or wind speed/direction. The IND 508c may overlay additional menus (626) with selectable inflight options, e.g., transitioning from cruise mode to hover mode (or vice versa); executing a landing at the nearest fuel stop; executing an emergency landing at the nearest available alternate landing zone; or diverting to a new destination (e.g., amending the flight plan via the RFC 504). It may be contemplated that while the emergency button 618 may be activated in the event of an emergency, the on/off button 616 may be locked out from deactivating functions of the VTOL aircraft 100 if the aircraft is currently inflight or above ground level.

Figure 14J:
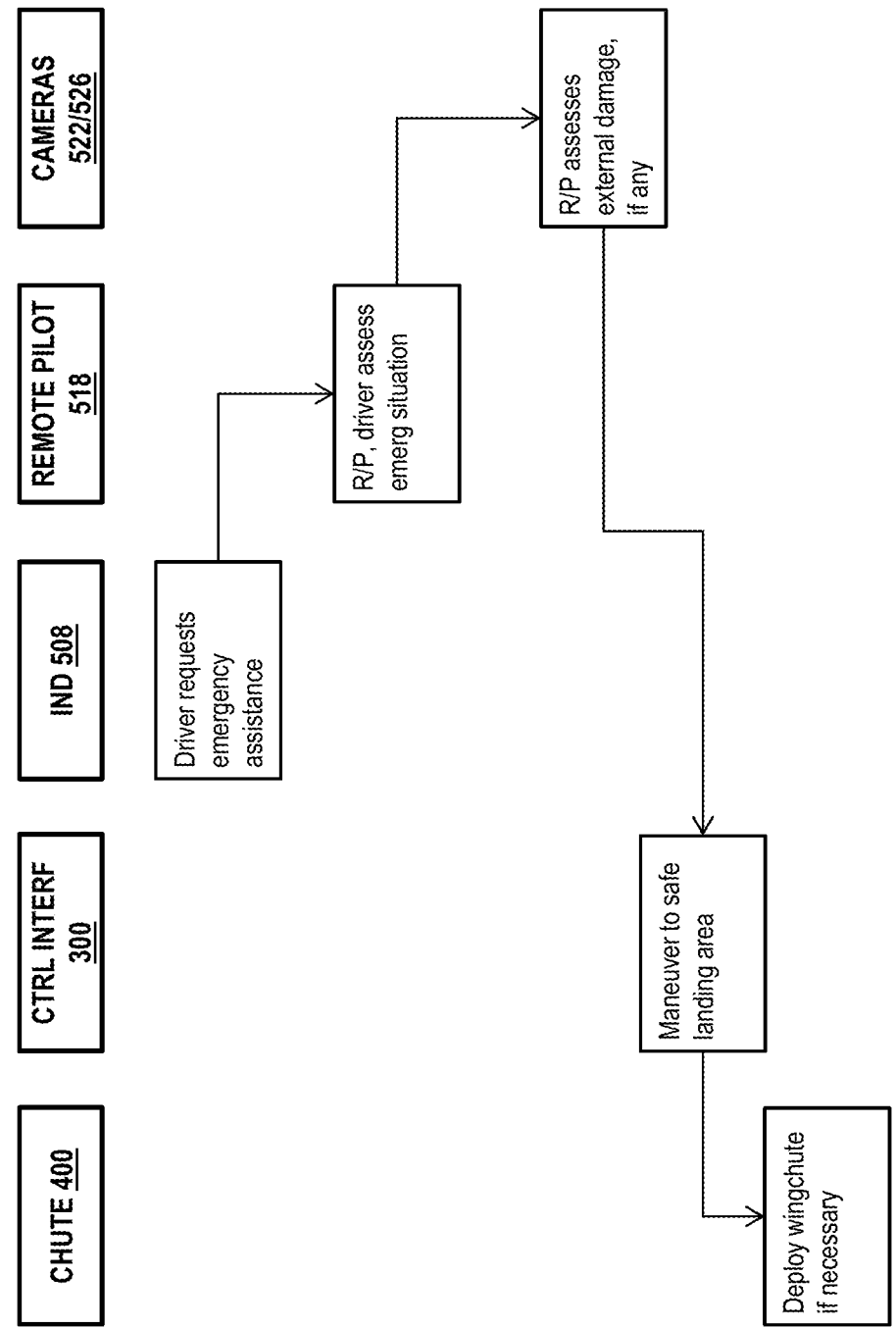

Referring to FIG. 14J, at the step 608, the user 602 may request (via the emergency button 618 on the IND 508) emergency assistance from a remote pilot 518. The remote pilot 518 may assess the situation by conversing with the driver 502 to determine the nature of the problem, or refer to the external cameras 526 in an attempt to assess any external damage to the VTOL aircraft 100. Emergency resolutions may prioritize quickly landing the VTOL aircraft 100 in a safe location (e.g., away from populations, ground traffic, or uneven terrain) if at all possible. If necessary, the driver 502 may deploy onboard emergency measures such as the wingchute system 400. The remote pilot 518 may assume partial control of the VTOL aircraft 100. For example, the remote pilot 518 may remotely deploy the wingchute system 400; maneuver the VTOL aircraft 100 toward an alternate landing site and then deploy the wingchute system 400; remotely change the destination, airspeed, altitude, or cruising track of the aircraft; or take no action (if, for example, no pressing emergency exists).

Figure 14K:
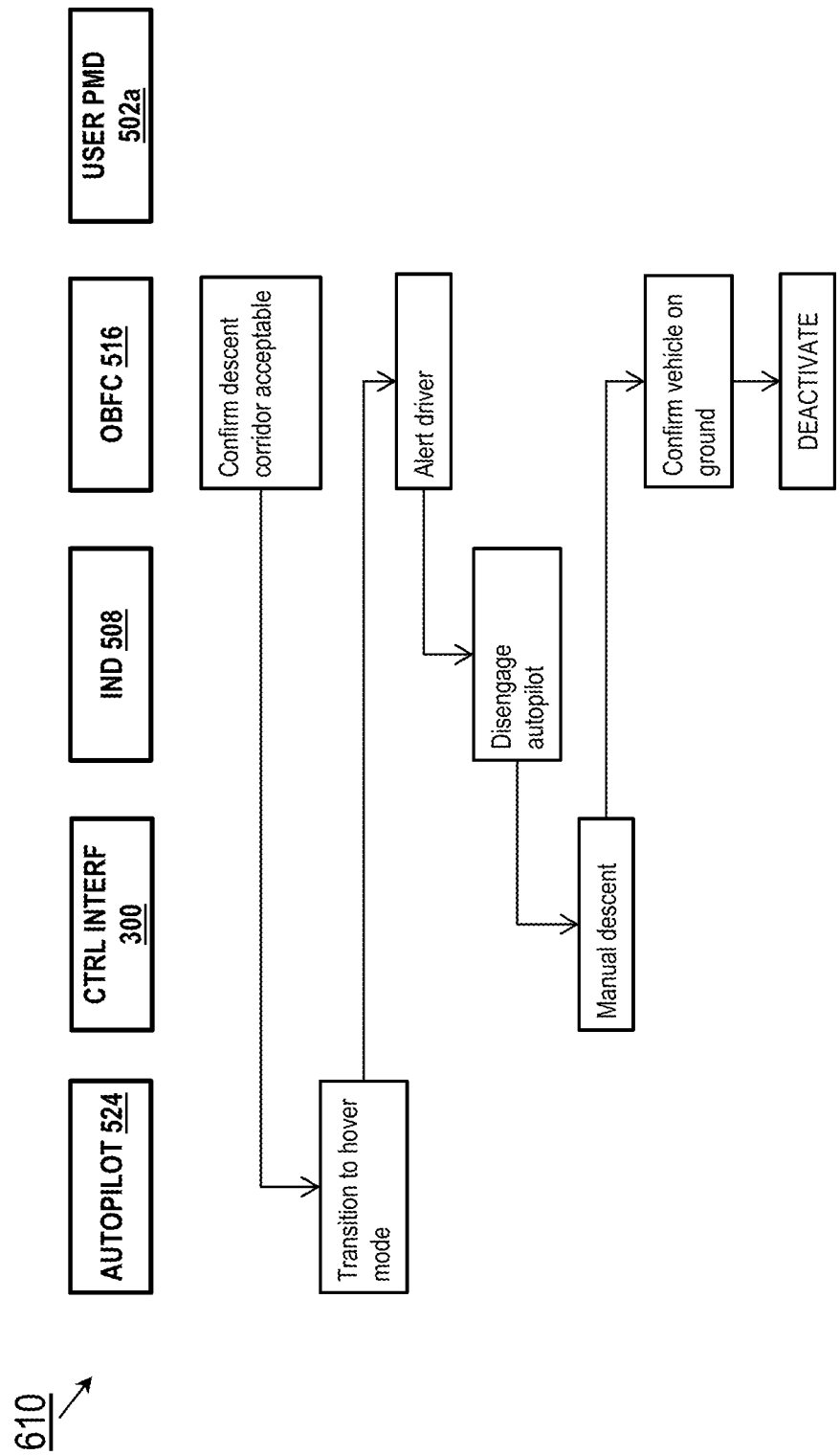

Referring to FIG. 14K, at the step 610, the landing area will be previously recently assessed by the PMD 502a as suitable for landing. Approaching the designated landing area or target destination, the VTOL aircraft 100 will transition (via the autopilot 524) from cruise mode to hover mode and descend under autopilot to a predetermined altitude (e.g. 100 ft AGL). At or approaching this altitude, the OBFC 516 will alert the driver 502 to take over control, and the driver will continue descending the VTOL aircraft 100 under manual control (e.g., via the control interface 300). Once the VTOL aircraft 100 has descended to a landing (touchdown confirmed by the OBFC 516), the driver 502 may deactivate the VTOL aircraft 100 (e.g., via the on/off dedicated button 616, FIG. 14I).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A variable-geometry vertical takeoff and landing (VTOL) aircraft system, comprising:
    a fuselage;
    one or more sensors coupled to the fuselage and configured to capture at least one of aircraft data associated with the aircraft system or environmental data external to the aircraft system;
    a flight control system connected to the one or more sensors and including at least one flight control processor, the flight control system configured to:
        receive at least one of the aircraft data or the environmental data from the one or more sensors;
        based on at least one of the aircraft data and the environmental data, determine a current flight phase associated with the aircraft system, the current flight phase including at least one of a hovering phase, a cruising phase, or a transitional phase;

at least one pair of thrust sources including a port thrust source and a starboard thrust source, each thrust source comprising:
a base frame comprising a main strut and a plurality of auxiliary struts, the main strut coupled to the fuselage via at least one strut actuator communicatively connected to the flight control system, the strut actuator configured to articulate the main strut relative to the fuselage;
a rotor shaft coupled to the base frame;
a plurality of propeller blades evenly spaced around the rotor shaft adjacent to the base frame, the plurality of propeller blades configured to be driven around the rotor shaft by at least one motor connected to the flight control system;
an annular duct capable of circumferentially surrounding the plurality of propeller blades and the plurality of auxiliary struts, and capable of partially surrounding the main shaft;
and
a plurality of linear actuators configured to articulate the annular duct relative to the main frame and including at least a first linear actuator coupled to the main strut and a second linear actuator coupled to each auxiliary strut, respectively, each linear actuator hingedly coupled to the main strut or the auxiliary strut and jointedly coupled to the annular duct;
the flight control system further configured to:
based on the current flight phase, control at least one of a thrust vector of the aircraft system, a heading of the aircraft system, an attitude of the aircraft system, a flight path of the aircraft system, an acceleration of the aircraft system, or a configuration of the aircraft system by at least one of:
adjusting a rotational speed of the plurality of propeller blades via the at least one motor;
articulating the at least one strut actuator;
or
articulating at least one of the plurality of linear actuators.

2. The variable-geometry VTOL aircraft system of claim 1, wherein the at least one pair of thrust sources includes a forward pair of thrust sources and an aft pair of thrust sources.

3. The variable-geometry VTOL aircraft system of claim 2, further comprising:
at least one passenger cabin disposed between the forward pair of thrust sources and the aft pair of thrust sources, the passenger cabin configured to accommodate at least one passenger and including a control interface configured to accept control input from the passenger.

4. The variable-geometry VTOL aircraft system of claim 3, further comprising:
a control interface situated within the passenger cabin, the control interface comprising:
at least one navigational display configured to 1) display one or more of the aircraft data and the environmental data and 2) accept first control input from the passenger;
and
at least one control yoke articulably coupled to a base in a default position, the control yoke articulable by the passenger in a plurality of degrees of freedom relative to the default position to provide second control input, the control system configured to adjust at least one of the thrust vector, the heading, the attitude, or the configuration based on the second control input and the current flight phase.

5. The variable-geometry VTOL aircraft system of claim 1, wherein the annular duct comprises:
at least one first segment having a first airfoil profile;
and
at least one second segment having a second airfoil profile.

6. The variable-geometry VTOL aircraft system of claim 5, wherein:
the at least one first segment corresponds to a first arc of the annular duct;
and
the at least one second segment corresponds to a second arc of the annular duct, the first arc greater than the second arc.

7. The variable-geometry VTOL aircraft system of claim 1, wherein the plurality of linear actuators are configured to at least one of individually or collectively articulate the annular duct relative to the main strut and to the plurality of auxiliary struts.

8. The variable-geometry VTOL aircraft system of claim 1, further comprising:
a fuel compartment coupled to the at least one motor, the fuel compartment configured for resupply via at least one refueling portal;
at least one tank flow sensor disposed within the fuel compartment, the tank flow sensor communicatively coupled to the control system and configured to sense a tank fuel level;
at least one refueling flow sensor coupled to the refueling portal, the refueling flow sensor communicatively coupled to the control system and configured to sense an actual refuel level;
and
at least one engine flow sensor operatively coupled to the at least one motor, the engine flow sensor communicatively coupled to the control system and configured to sense a consumed fuel level;
the control system further configured to:
determine an expected refuel level based on the sensed tank fuel level;
and
detect a fuel error based on a comparison of the expected refuel level and at least one of 1) the actual refuel level or 2) the consumed fuel level.

9. The variable-geometry VTOL aircraft system of claim 1, further comprising:
a deployable wingchute system disposed within the fuselage beneath at least one deployable panel, the wingchute system mechanically deployable and secured to the fuselage in a deployed state via one or more cables, the wingchute system comprising:
upper and lower external layers fashioned of an airtight fabric;
at least one airtight self-inflating compartment disposed between the upper and lower external layers;
and
at least one propellant system configured to rapidly inflate the at least one airtight self-inflating compartment when the wingchute is in the deployed state.

10. The variable-geometry VTOL aircraft system of claim 9, wherein the at least one airtight self-inflating compartment includes a plurality of self-inflating ribs extending radially from a central core in a spaced apart relationship, each adjacent pair of self-inflating ribs defining a ram-air inlet configured to allow airflow into the wingchute.

11. The variable-geometry VTOL aircraft system of claim 9, wherein the wingchute system presents a substantially aliform profile.

12. The variable-geometry VTOL aircraft system of claim 5, wherein the annular duct comprises:
   at least one change section associated with a transition between the first segment and the second segment, the change section associated with a blending of the first airfoil profile and the second airfoil profile.

* * * * *